United States Patent
Taylor

(10) Patent No.: US 10,471,628 B2
(45) Date of Patent: Nov. 12, 2019

(54) CRYSTALLINE CARBON FIBER ROPE AND METHOD OF MAKING SAME

(71) Applicant: Rapid Heat Sinks, LLC, Myakka City, FL (US)

(72) Inventor: Alan Taylor, Myakka City, FL (US)

(73) Assignee: Rapid Heat Sinks, LLC, Myakka City, FL (US)

( * ) Notice: Subject to any disclaimer, the term of this patent is extended or adjusted under 35 U.S.C. 154(b) by 37 days.

(21) Appl. No.: 15/291,665

(22) Filed: Oct. 12, 2016

(65) Prior Publication Data

US 2017/0100855 A1     Apr. 13, 2017

Related U.S. Application Data

(60) Provisional application No. 62/240,460, filed on Oct. 12, 2015.

(51) Int. Cl.
*B29B 11/16* (2006.01)
*B29B 15/12* (2006.01)
(Continued)

(52) U.S. Cl.
CPC ............ *B29B 11/16* (2013.01); *B29B 15/125* (2013.01); *B29B 15/127* (2013.01); *B29C 43/003* (2013.01); *B29C 43/36* (2013.01); *D07B 1/02* (2013.01); *B29B 15/122* (2013.01); *B29C 2043/3613* (2013.01); *B29K 2033/20* (2013.01); *B29K 2101/10* (2013.01); *B29K 2105/106* (2013.01); *B29K 2301/12* (2013.01); *B29K 2307/04* (2013.01); *B29K 2507/04* (2013.01); *B29K 2995/0013* (2013.01); *D07B 1/025* (2013.01); *D07B 2201/2033* (2013.01);
(Continued)

(58) Field of Classification Search
CPC .............. D07B 1/02; D07B 2205/3007; D07B 2801/10; B29C 2043/3613; B29C 43/36; B29C 43/00; B29C 43/003; B29C 70/521; B29K 2033/20; B29K 2101/10; B29K 2301/12; B29K 2307/04; B29K 2507/04; B29K 2301/04; B29B 11/16; B29B 15/12; B29B 15/125; B29B 15/127; H01B 5/105; Y10T 428/2933; Y10T 428/2938; Y10T 428/249946; B29L 2031/3462
USPC .......... 428/299.4, 299.1, 375, 378; 156/180; 427/434.6; 442/43
See application file for complete search history.

(56) References Cited

U.S. PATENT DOCUMENTS 3,533,743 A * 10/1970 Orr, Jr. ...................... D01F 9/22
                                                          264/DIG. 19
7,189,778 B2    3/2007 Tobita et al.
(Continued)

FOREIGN PATENT DOCUMENTS

KR    10-2010-0024869    3/2010
WO    2004-085129        10/2004

OTHER PUBLICATIONS

Search Report and Written Opinion; Corresponding PCT Application No. PCT/US2016/056608; dated Sep. 22, 2017; Authorized Officer Min, In Gyou.

*Primary Examiner* — Camie S Thompson
(74) *Attorney, Agent, or Firm* — Squire Patton Boggs US LLP

(57) ABSTRACT

A thermally conductive rope includes a plurality of tows of crystalline carbon fiber, a plurality of tows of additional fiber, and at least one of a thermoset and thermoplastic.

4 Claims, 26 Drawing Sheets

(51) Int. Cl.
    *B29C 43/00*     (2006.01)
    *B29C 43/36*     (2006.01)
    *D07B 1/02*     (2006.01)
    *B29K 33/20*     (2006.01)
    *B29K 101/10*     (2006.01)
    *B29K 105/10*     (2006.01)
    *B29K 301/12*     (2006.01)
    *B29K 307/04*     (2006.01)
    *B29K 507/04*     (2006.01)

(52) U.S. Cl.
    CPC ............... *D07B 2201/2046* (2013.01); *D07B 2205/205* (2013.01); *D07B 2205/3007* (2013.01)

(56) References Cited

U.S. PATENT DOCUMENTS

| | | | |
|---|---|---|---|
| 7,875,801 B2 | 1/2011 | Tsotsis | |
| 9,023,462 B2 | 5/2015 | Lee et al. | |
| 9,090,751 B2 | 7/2015 | Saga et al. | |
| 2008/0233380 A1* | 9/2008 | Hiel | ........................ B32B 15/04 428/299.4 |
| 2015/0037530 A1* | 2/2015 | Zhamu | ........................ D01F 9/12 428/113 |

* cited by examiner

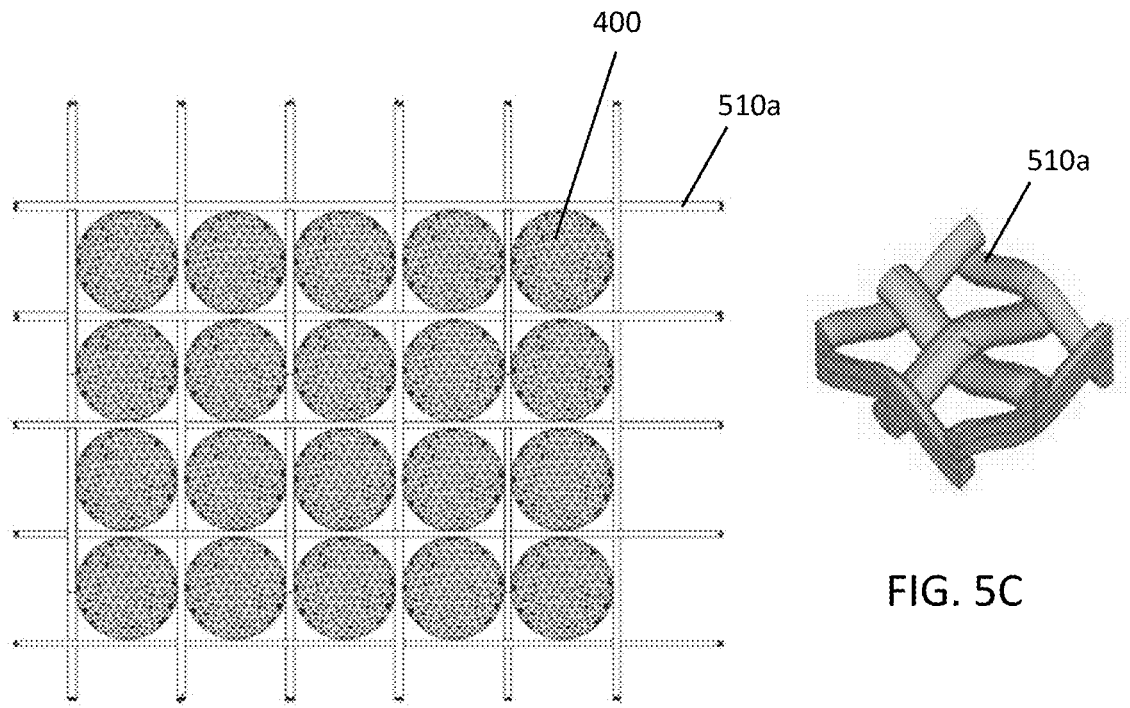
FIG. 5B
FIG. 5C
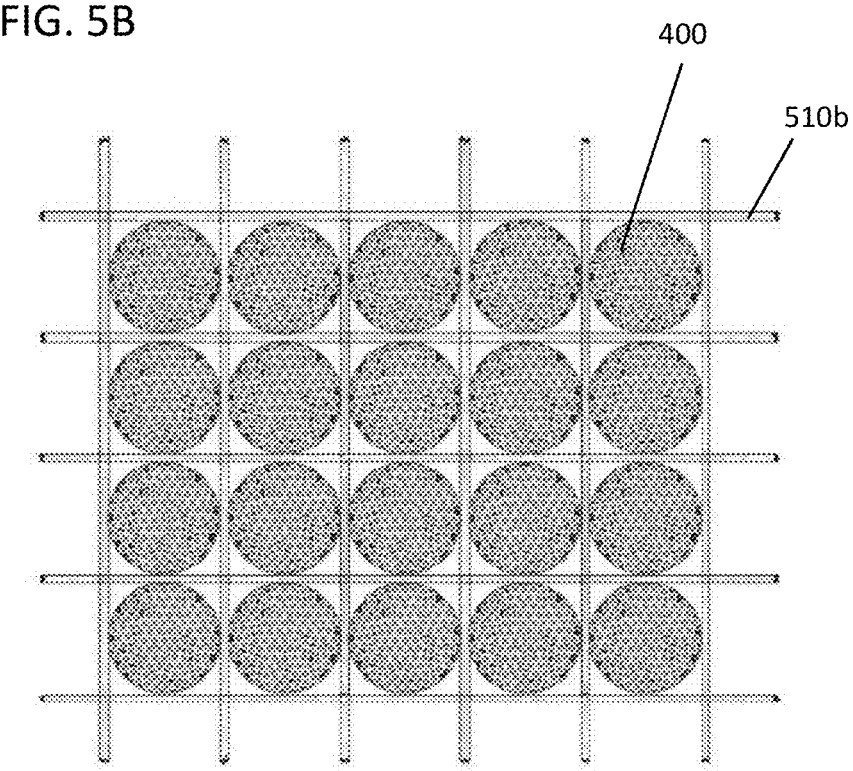
FIG. 5D

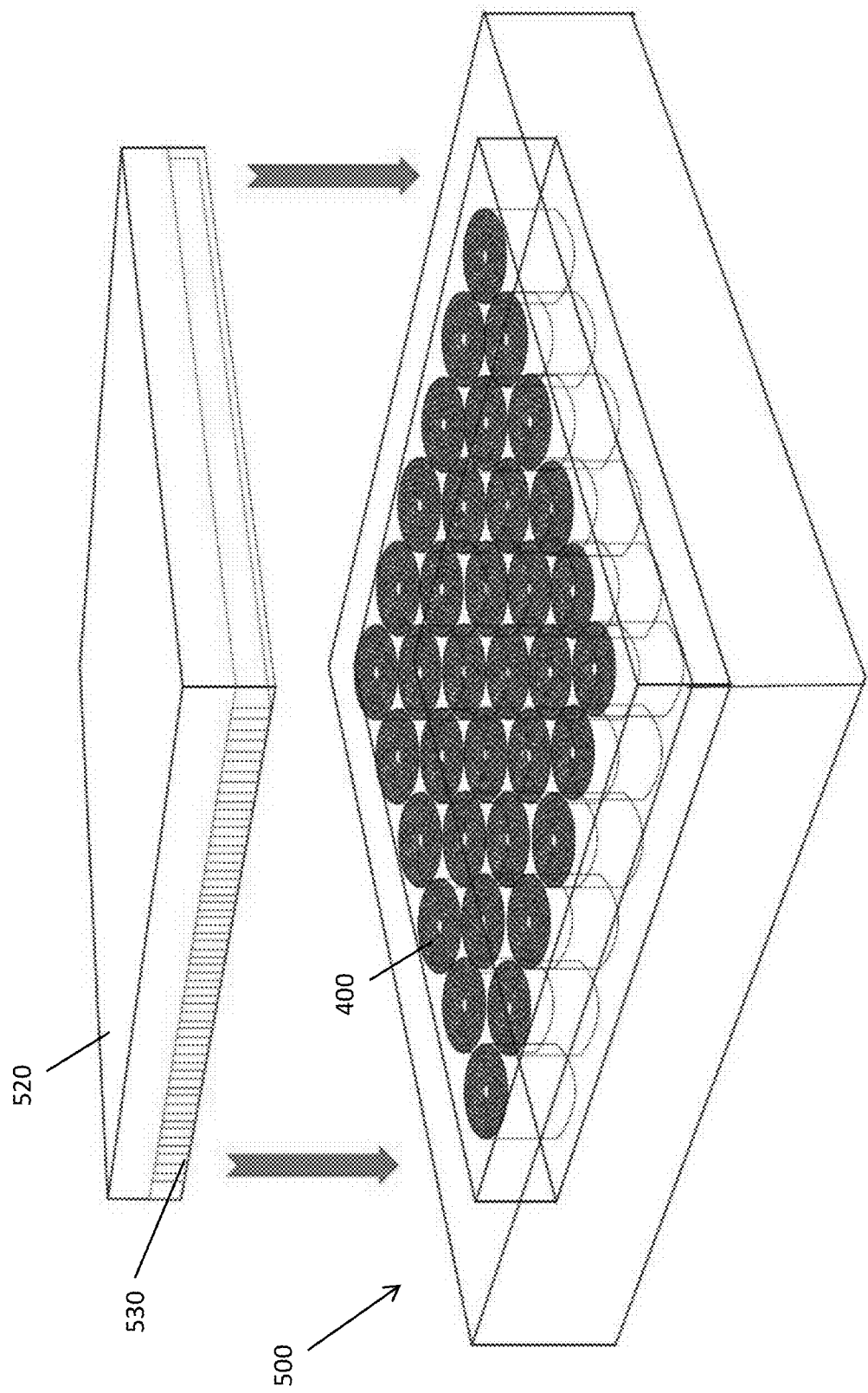

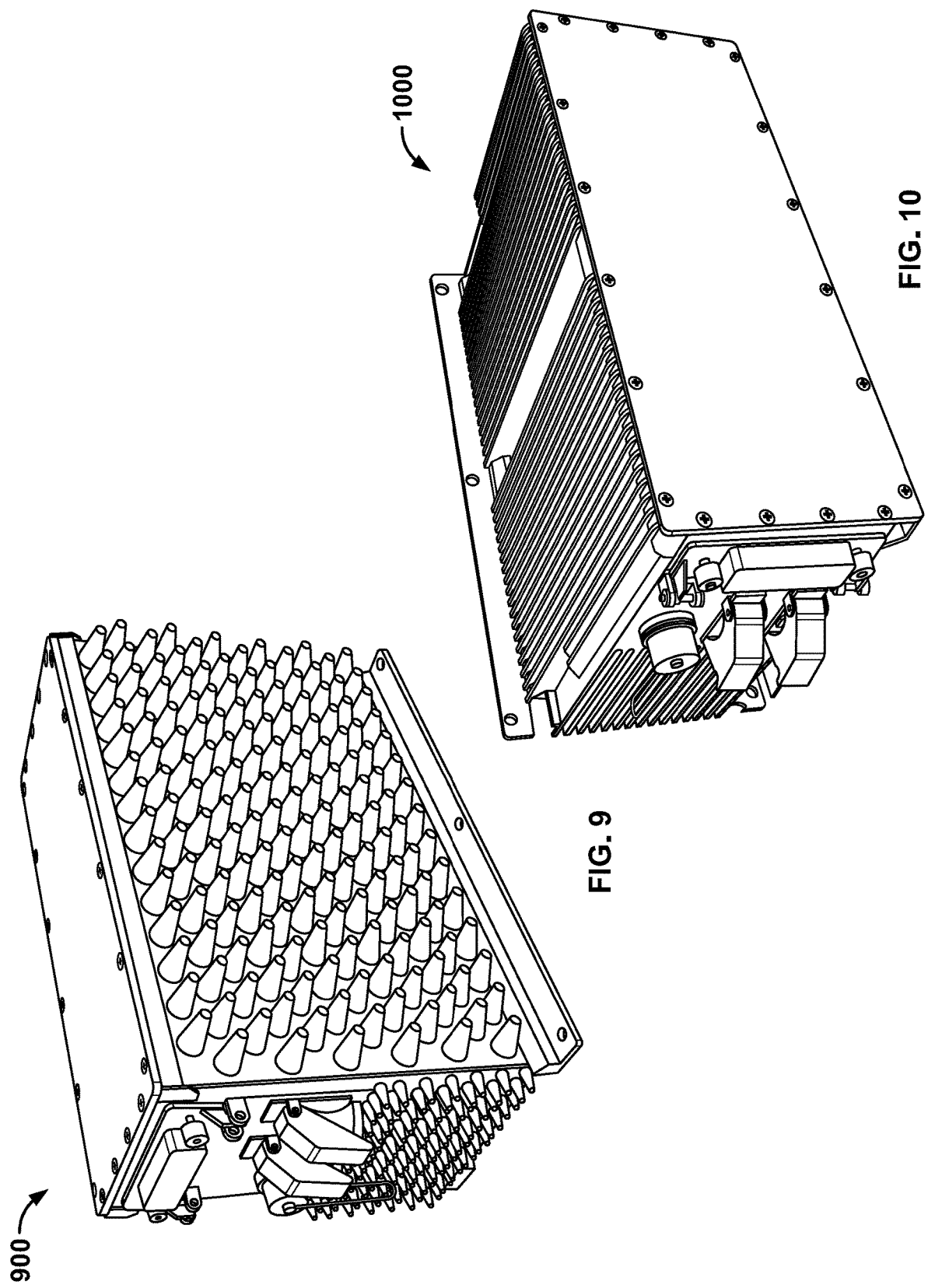

CRYSTALLINE CARBON FIBER ROPE AND METHOD OF MAKING SAME

CROSS-REFERENCE TO RELATED APPLICATIONS

This application claims priority to U.S. Provisional Patent Application No. 62/240,460, filed on Oct. 12, 2015, the disclosure of which is incorporated by reference herein in its entirety.

FIELD OF INVENTION

The present disclosure is directed to a thermally conductive rope. More particularly, the present disclosure is directed to a thermally conductive rope constructed in part of crystalline carbon fibers.

BACKGROUND

Crystalline carbon fibers are known in the art. Examples of crystalline carbon include graphite, graphene, graphene oxide, non-fiber, non-particles, buckypaper, and pitch fibers. Pitch is a viscoelastic material that is composed of aromatic hydrocarbons, and is produced via the distillation of carbon-based materials, such as plants, crude oil, coal tar, and coal.

Crystalline carbon fibers have a high thermal conductivity in the axial direction. However, they have a much lower thermal conductivity in the radial direction. For example, pitch fibers may have a thermal conductivity of up to 900 W/m·K in the axial direction, but have a thermal conductivity as low as 30 W/m·K in the radial direction.

SUMMARY OF THE INVENTION

In one embodiment, a thermally conductive rope includes a plurality of tows of crystalline carbon fiber, a plurality of tows of additional fiber, and at least one of a thermoset and thermoplastic.

In another embodiment, a method of making a thermally conductive rope includes providing a plurality of tows of crystalline carbon fiber, providing a plurality of tows of additional fiber, and commingling the plurality of tows of crystalline carbon fiber with the plurality of tows of additional fiber.

In yet another embodiment, a method of making a thermally conductive component includes providing a plurality of tows of crystalline carbon fiber, providing a plurality of tows of additional fiber, and forming a rope of the plurality of tows of crystalline carbon fiber and the plurality of tows of additional fiber. The method further includes cutting the rope into a plurality of rope segments, placing the plurality of rope segments in a mold, and applying heat and pressure in the mold to form the plurality of rope segments into a desired shape. The method also includes removing the formed shape from the mold.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 9 illustrates a perspective view of another exemplary component formed by compression molding a plurality of crystalline carbon fiber rope segments;

FIG. 10 illustrates a perspective view of yet another exemplary component formed by compression molding a plurality of crystalline carbon fiber rope segments;

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Tow" means an untwisted bundle of continuous filaments.

"Yarn" means a twisted bundle of filaments, not necessarily continuous. For the purposes of this application, "tow" and "yarn" may be used interchangeably.

Filaments come in various qualities, and form tows and yarns of various sizes. A "K" number indicates how many thousands of filaments are present per tow. For example, "1K" means 1000 filaments per tow.

Figure 1A:
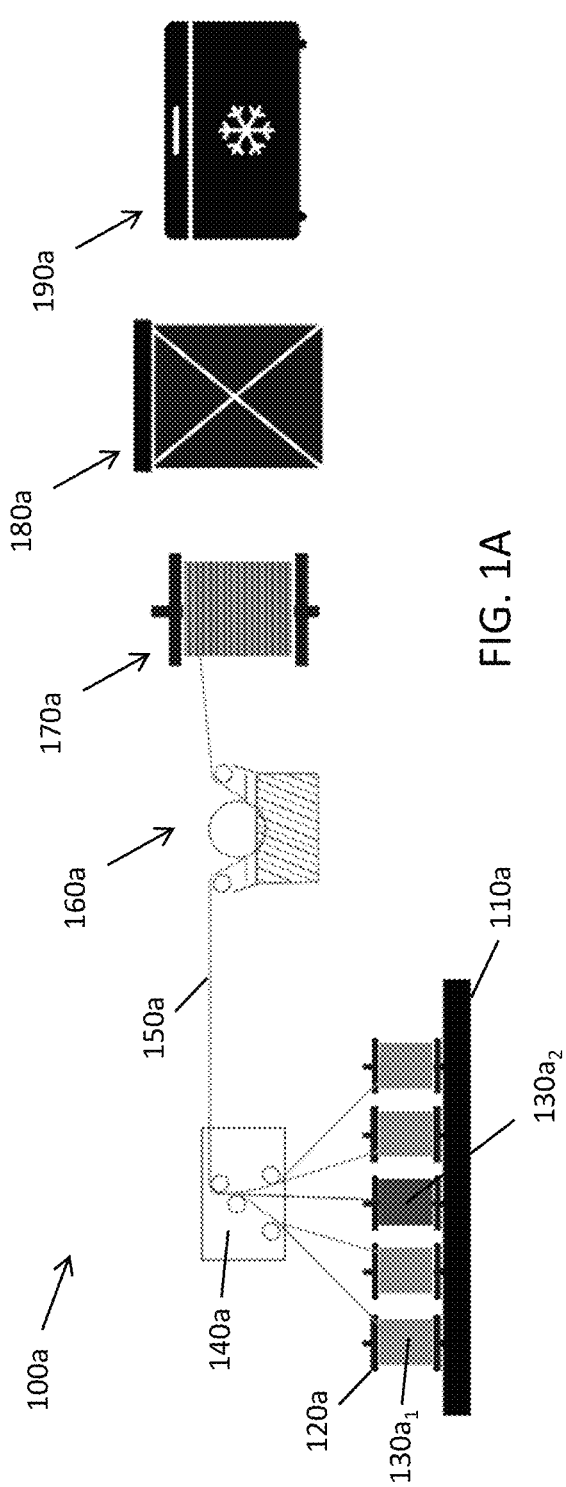
FIG. 1A is a schematic drawing illustrating one embodiment of a system for forming a crystalline carbon fiber rope.

FIG. 1A is a schematic drawing illustrating one embodiment of a system 100a for forming a crystalline carbon fiber rope. In this particular method of forming a crystalline carbon fiber rope, thermosets are employed. The system 100a includes a creel 110a housing a plurality of spindles (or spools) 120a. While five spindles 120a are shown in the illustrated embodiment, in alternative embodiments any number of spindles may be employed. For example, some systems may include 5-10 spindles, while other systems may include 10-50 spindles. In still other systems, upwards of 50 or even upwards of 100 spindles may be employed.

While a single creel 110a is shown, it should be understood that two or more creels may be employed. In one embodiment, the creel and spindles are in a fixed position. In an alternative embodiment, the spindles may translate along the creel. In another alternative embodiment, the creel rotates about an axis.

Each spindle 120a carries a spool of tow or yarn 130a. In the illustrated embodiment, the spindles carry a first-type tow or yarn $130a_1$ and a second-type tow or yarn $130a_2$. In one embodiment, the first-type tow or yarn $130a_1$ is a tow of crystalline carbon fiber. Exemplary crystalline carbon fibers include, without limitation: pitch fiber, graphite, buckypaper, carbon nano materials, graphene, PEMTEX. However, it should be understood that any type of crystalline carbon fiber may be employed.

In one embodiment, the second-type tow or yarn $130a_2$ is a tow of additional fiber. The additional fiber may be crystalline fiber, semi-crystalline fiber, synthetic fiber, or hybrid fiber. Exemplary additional fibers include, without limitation: polyacrylonitrile (PAN) fiber, aramid fibers (such as Kevlar), thermoplastic, and boron nitride (BN). However, it should be understood that any type of fiber may be employed.

The first-type and second-type tows may be selected based on characteristics that are desirable for a particular application. For example, pitch fiber may be selected as a first-type tow because of its high thermal conductivity. However, while pitch fiber may have sufficiently high tensile strength for many applications, it may be too brittle for certain applications. Therefore, it may be desirable to select a resilient material as a second-type tow. Other characteristics, such as strength, hardness, weight, cost, electrical conductivity, thermal conductivity, dielectrical properties, density, dissipative properties, and stability may be considered in the selection of the first-type and second-type tows or yarns.

In the illustrated embodiment, four of the tows are first-type tows $130a_1$ and one of the tows is a second-type tow $130a_2$. However, the ratio of first-type and second-type tows or yarns may be selected according to the desired characteristics of the final rope product. In an alternative embodiment (not shown), three or more types of tows or yarns may be employed.

The tows or yarns 130a are fed into a rope forming machine 140a. In one embodiment, the rope forming machine is a braiding machine that braids the tows or yarns 130a into a rope 150a. Exemplary rope forming machines include, without limitation, braiding or winding machines manufactured by RATERA, HERZOG, O.M.A., and MAYER INDUSTRIES. In an alternative embodiment, a plurality of braiding machine may first braid the tows or yarns into a plurality of ropes. Then the ropes are fed into a large braiding machine that braids the plurality of ropes into a single, larger rope. In another alternative embodiment, the rope forming machine is a winding machine that twists the tows or yarns to form a rope. In yet another alternative embodiment, the tows or yarns may simply be pulled in proximity together, without braiding or twisting.

In the illustrated embodiment, after the rope 150a is formed by the rope forming machine 140a, it is immersed in resin bath 160a. The resin may be formed from any thermoset material. Exemplary thermosets include, without limitation: polyester resins, epoxy resins, melamine resins, polyimides, urea-formaldehyde, duroplast, vinyl ester, and bakelite. The resin forms a matrix between the tows or yarns 130a of the rope 150a. In alternative embodiments, the matrix may be formed by spraying the rope or by infusing the tows or yarns prior to forming the rope. In other alternative embodiments, the matrix may be formed by powder coating, resin baths, insitu-lamination, co-lamination, or by comingling fibers with thermoplastic fiber.

The rope 150a is then wound onto a spool 170a. If the rope 150a will not immediately be used in a molding operation, a plurality of spools 170a may be placed in a box 180a for storage or shipping. Because of the limited shelf life of thermosets, it may be desirable to store the spools 170a in a freezer 190a to prolong the useful life of the rope 150a. The freezer 190a may maintain the spools at a temperature of −32° F. to 32° F. (−36° C. to 0° C.).

In an alternative embodiment (not shown), the system may include a sheathing machine for encasing the rope 150 in a sheath. The sheath may be used to prevent fibers or particulates from sloughing off of the rope. The sheath may be wound about the rope or woven or braided about the rope. Alternatively, the sheath may encase the rope by a shrink wrapping process. The sheath may be constructed of thermoplastic, PAN fiber, aramid fibers, BN, impregnated acrylonitrile butadiene styrene (ABS), polyether ether ketone (PEEK), rubber, a polymer coated fiber, or any other material.

In one embodiment, 65% of the volume of the rope is composed of fiber, with the remaining volume comprised of the matrix and the optional sheath. In an alternative embodiment, 65-75% of the volume of the rope is composed of fiber. In another alternative embodiment, less than 65% of the volume of the rope is composed of fiber. For example, 45% fiber volume may be used for standard applications, and 55% fiber volume may be used for automotive applications. The fiber volume may be selected according the needs of a particular application.

Figure 1B:
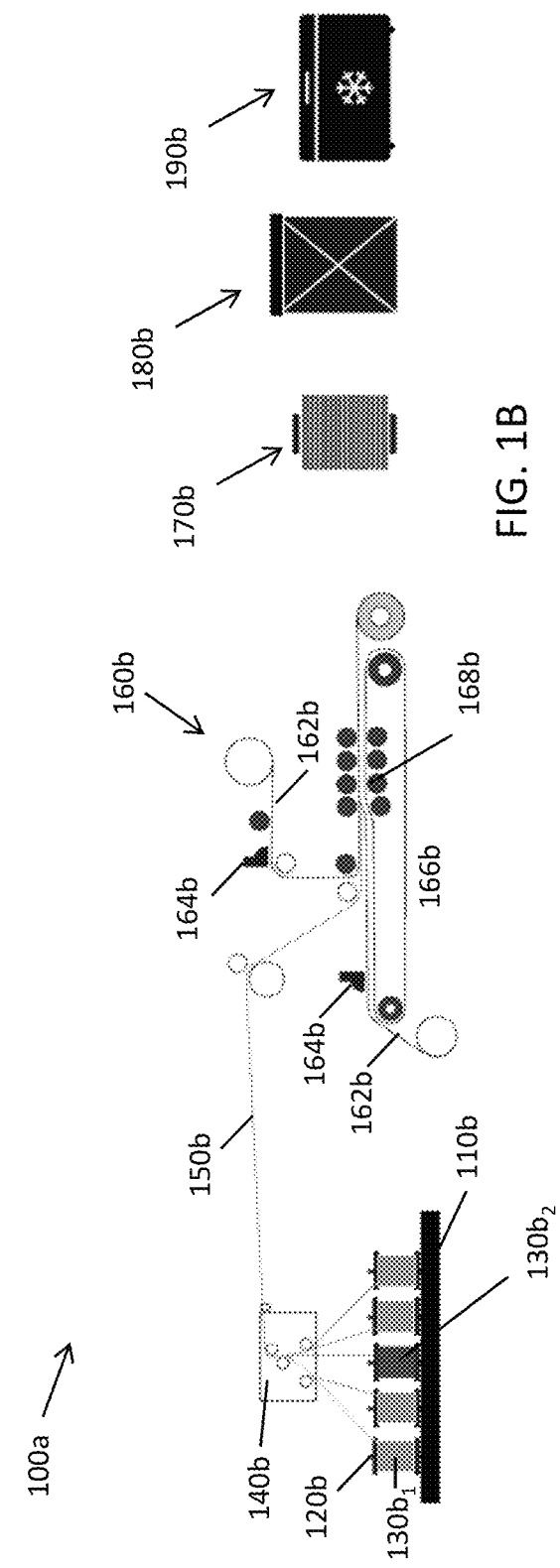
FIG. 1B is a schematic drawing illustrating an alternative embodiment of a system for forming a crystalline carbon fiber rope.

FIG. 1B is a schematic drawing illustrating one embodiment of a system 100b for forming a crystalline carbon fiber rope. In this particular method of forming a crystalline carbon fiber rope, thermosets are employed. The system 100b is substantially the same as the system 100a described above (including the alternative embodiments) with reference to FIG. 1A, except for the differences described herein. Therefore, redundant details are omitted for the sake of brevity.

The system 100b includes a creel 110b housing a plurality of spindles 120b. Each spindle 120b carries a spool of tow or yarn 130b. In the illustrated embodiment, the spindles carry a first-type tow or yarn $130b_1$ and a second-type tow or yarn $130b_2$. The tows or yarns 130b are fed into a rope forming machine 140b to form a rope 150b.

In the illustrated embodiment, after the rope 150b is formed by the rope forming machine 140b, it goes through a coating machine 160b. The coating machine 160b coats the rope 160b through a quasi-isotropic process, which also infuses the coating material throughout the rope and forms a matrix in the spaces between the yarns or tows of fibers. The coating material may include other structural or conductive fillers, such as CNT, CNF, graphene, graphene oxide, milled pitch fiber, milled pan fiber, susceptible particles, and other known fillers. Such fillers may improve mechanical properties, interstitial conductivity, bonding, crosslinking, cross-coupling, or other aspects.

The coating machine 160b includes a pair of rolls of carrier film 162b. The carrier film may be Mylar or any other carrier material. The coating machine 160b unspools the carrier film 162b from the rolls, then applicators 164b apply resin to each carrier film 162b. The resin may be formed from any thermoset material. Exemplary thermosets include, without limitation: polyester resins, epoxy resins, melamine resins, polyimides, duroplast, polyimide, PVDF, bezoxazines, phthalonitriles, bismaleimides, cyanate esters, and bakelite.

The rope 150b is then sandwiched between the carrier films 162b, and the rope and films are drawn through the coating machine 160b by a carrier belt 166b. Compacting rollers 168b apply pressure to rope 150b and carrier films 162b, which seals the rope between the films, and disperses the resin throughout the rope.

The rope 150b is then wound onto a spool 170b. If the rope 150b will not immediately be used in a molding operation, a plurality of spools 170b may be placed in a box 180b for storage or shipping. Because of the limited shelf life of thermosets, it may be desirable to store the spools 170b in a freezer 190b to prolong the useful life of the rope 150b.

Figure 2:
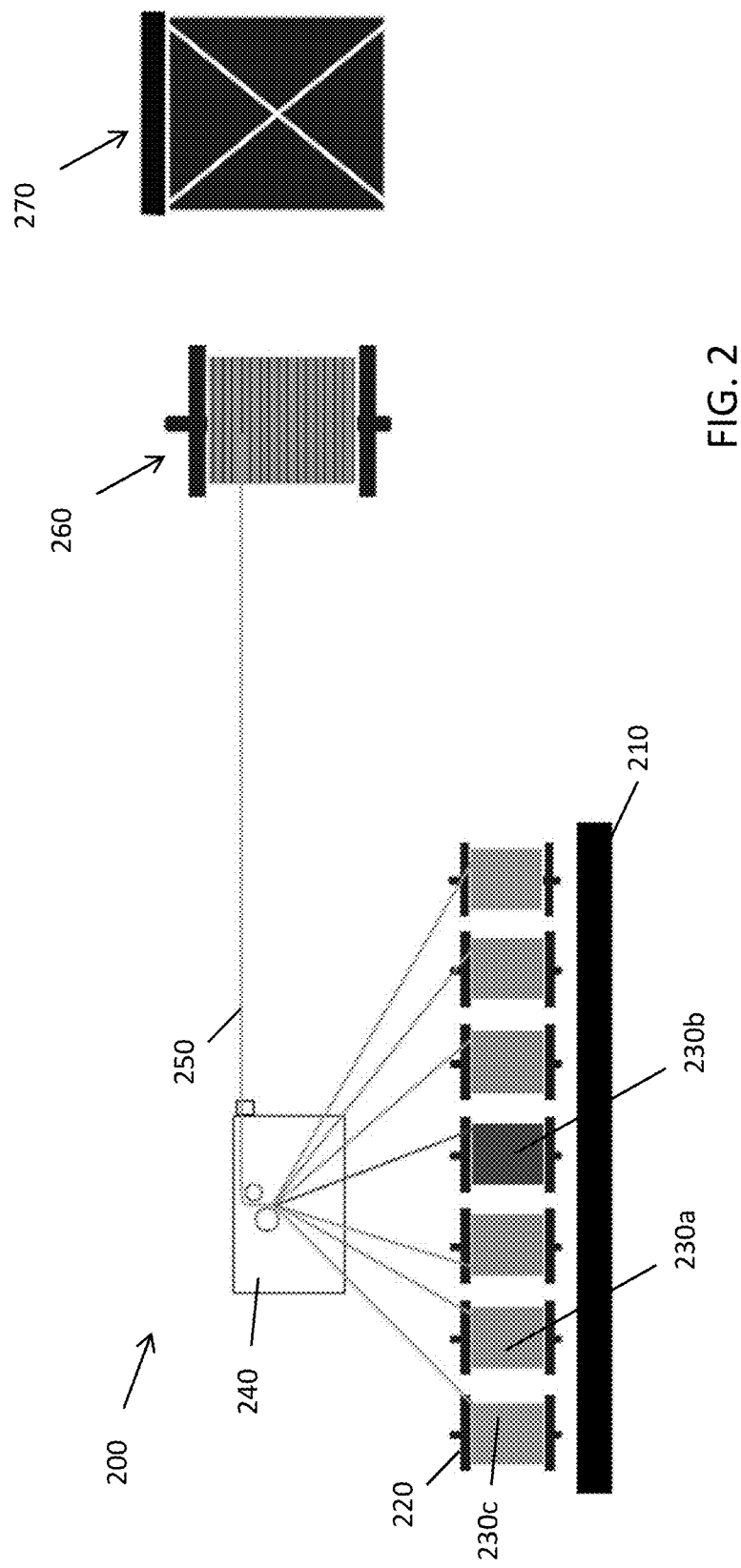
FIG. 2 is a schematic drawing illustrating another alternative embodiment of a system for forming a crystalline carbon fiber rope.

FIG. 2 is a schematic drawing illustrating an alternative embodiment of a system 200 for forming a crystalline carbon fiber rope. In this particular method of forming a crystalline carbon fiber rope, thermoplastics are employed. The system 200 includes a creel 210 housing a plurality of spindles 220. While seven spindles 220 are shown in the illustrated embodiment, in alternative embodiments any number of spindles may be employed. For example, some systems may include 5-10 spindles, while other systems may include 10-50 spindles. In still other systems, upwards of 50 spindles or even upwards of 100 spindles may be employed.

While a single creel 210 is shown, it should be understood that two or more creels may be employed. In one embodiment, the creel and spindles are in a fixed position. In an alternative embodiment, the spindles may translate along the creel. In another alternative embodiment, the creel rotates about an axis.

Each spindle 220 carries a spool of tow or yarn 230. In the illustrated embodiment, the spindles carry a first-type tow or yarn 230a, a second-type tow or yarn 230b, and a third-type tow or yarn 230c. In one embodiment, the first-type tow or yarn 230a is a tow of crystalline carbon fiber and the second-type tow or yarn 230b is a tow of fiber selected from the group consisting of: PAN fiber, aramid fibers (such as Kevlar), thermoplastic, and BN. However, it should be understood that any type of fibers may be employed. Additionally, the third-type tow or yarn 230c is a tow of thermoplastic fiber. Exemplary thermoplastics include, without limitation: acrylic, ABS, nylon, polyamide (PA), polyactic acid (PLA), polybenzimidazole (PBI), polycarbonate (PC), polyether sulfone (PES), PEEK, polyetherimide (PEI), polyethylene, polyphenylene oxide (PPO), polyphenylene sulfide (PPS), polypropylene (PP), polystyrene, polytetrafluoroethylene (PTFE), and Polyvinyl chloride (PVC). The first-type, second-type, and third-type tows or yarns may be selected based on characteristics that are desirable for a particular application.

In the illustrated embodiment, four of the tows are first-type tows 230a, one of the tows is a second-type tow 230b, and two of the tows are third-type tow 230c. However, the proportion of tow or yarn types may be selected according to the desired characteristics of the final rope product. In an alternative embodiment (not shown), four or more types of tows or yarns may be employed.

The tows or yarns 230 are fed into a rope forming machine 240. In one embodiment, the rope forming machine is a braiding machine that braids the tows or yarns 230 into a rope 250. In an alternative embodiment, a plurality of braiding machine may first braid the tows or yarns into a plurality of ropes. The plurality of ropes are then fed into a large braiding machine that braids the plurality of ropes into a single, larger rope. In another alternative embodiment, the rope forming machine is a winding machine that twists the tows or yarns to form a rope. In yet another alternative embodiment, the tows or yarns may simply be pulled in proximity together, without braiding or twisting.

The rope 250 is then wound onto a spool 260. If the rope 250 will not immediately be used in a molding operation, a plurality of spools 260 may be placed in a box 270 for storage or shipping. In an alternative embodiment (not shown), the system may include a sheathing machine for encasing the rope 250 in a sheath. The sheath may be used to prevent fibers or particulates from sloughing off of the rope. The sheath may be wound about the rope or woven about the rope. Alternatively, the sheath may encase the rope by a shrink wrapping process. The sheath may be constructed of the materials described above with respect to FIG. 1.

In one embodiment, 65% of the volume of the rope is composed of fiber, with the remaining volume comprised of the matrix and the optional sheath. In an alternative embodiment, 65-75% of the volume of the rope is composed of fiber. In another alternative embodiment, less than 65% of the volume of the rope is composed of fiber. For example, 45% fiber volume may be used for standard applications, and 55% fiber volume may be used for automotive applications. The fiber volume may be selected according the needs of a particular application.

In any of the embodiments described above with reference to FIGS. 1-2, metallic yarn may also be introduced and co-mingled with the other fibers during the forming of the rope. Exemplary metals include, without limitation: aluminum (including Al 1145, Al 3003, and Al 1100), brass (including brass 260, brass 70-30, brass 80-20, and brass 85-15), bronze (including bronze 90), cadmium, copper, gold, hastiloy (including hastiloy x), haynes (including haynes 214), inconell (including inconell 600), iron, lead, magnesium, molybdenum, nickel (including Ni 201 and Ni 899L), niobium, palladium, platinum, platinum clad niobium, silver, steel (including SS 304L, SS 316L, SS 444, and steel 1008), tantalum, titanium, zinc (including zinc 500), and zirconium.

In one embodiment, the rope includes a sufficient amount of metallic fiber to be used as an insulated wire. The additional fibers and sheathing, separated by some form of dielectric insulator between the two conductive components, help transfer or convect heat of the wire.

Additionally, in any of the embodiments described above with reference to FIGS. 1-2, the yarns or tows may be combined with carbon nano-tubes or carbon nano fiber to improve thermal interfacing. Additionally, the tows or yarns may be highly graphitized or combined with other pyrolytic graphite materials to either improve costs or improve thermal interfacing.

FIGS. 3A-3E illustrate cross-sections of exemplary embodiments of crystalline carbon fiber rope 300 that may be formed by one of the processes discussed above with reference to FIGS. 1 and 2. While various embodiments are discussed, it should be understood that the materials listed are not exhaustive.

Figure 3A:
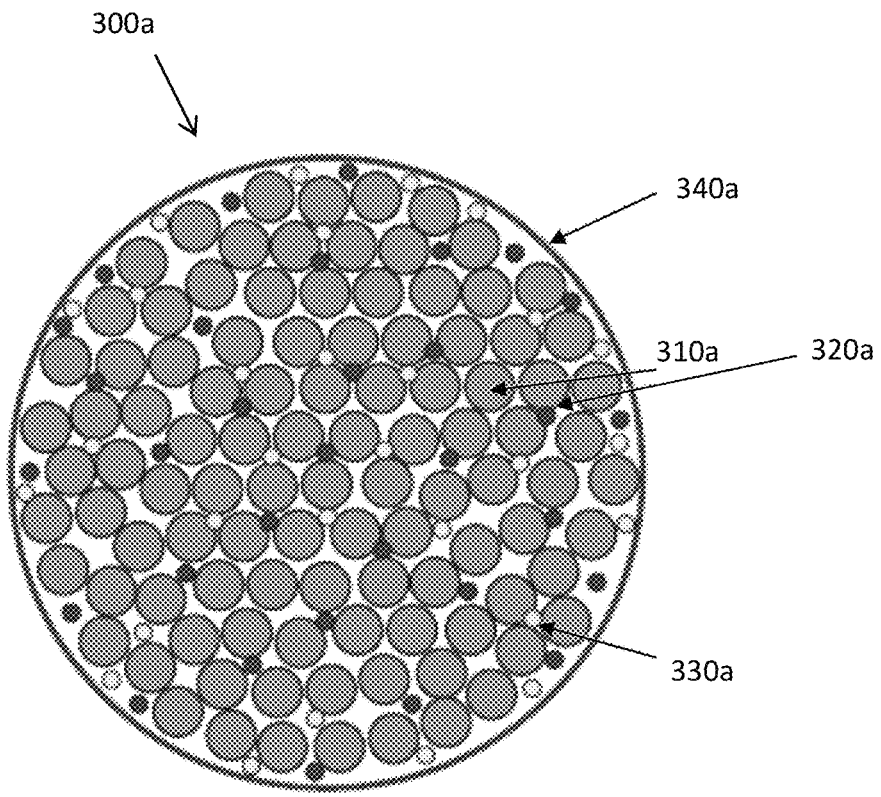
FIGS. 3A-3E illustrate cross-sections of exemplary embodiments of crystalline carbon fiber rope.

FIG. 3A illustrates a cross-section of one embodiment of a crystalline carbon fiber rope 300a having a plurality of crystalline carbon fibers 310a. In one embodiment, the crystalline carbon fibers 310a are pitch fibers. In alternative embodiments, other crystalline carbon fibers may be employed, such as the alternatives listed above with reference to FIG. 1. The crystalline carbon fibers 310a may include multiple types of crystalline carbon fibers.

The crystalline carbon fiber rope 300a also includes a plurality of additional fibers 320a. In one embodiment, the additional fibers 320a are PAN fibers. In alternative embodiments, the additional fibers 320b are aramid fibers or thermoplastic fibers.

In the illustrated embodiment, the additional fibers 320a have a substantially smaller diameter than the crystalline carbon fibers 310a. In one example, the crystalline carbon fibers 310a are provided in a 6K tow and the additional fibers 320a are provided in a 1K tow. In another example, the crystalline carbon fibers 310a are provided in a 12K tow and the additional fibers 320a are provided in a 3K tow. Other examples should be apparent to one of ordinary skill in the art. The crystalline carbon fibers 310a may be provided in 1K to 12K tow and the additional fibers 320a may be provided in 3K to 50K tow.

The additional fibers 320a are evenly distributed throughout the rope 300a. This may be achieved by first braiding the tows of crystalline carbon fibers 310a and the tows of additional fibers 320a into a plurality of ropes, and then braiding the plurality of ropes into a single, larger rope 300a. Alternatively, the distribution may be achieved by simultaneously braiding all of the tows of crystalline carbon fibers 310a and additional fibers 320a into a single rope 300a. In another alternative embodiment (not shown), the additional fibers 320a are randomly distributed throughout the rope 300a.

The crystalline carbon fiber rope 300a also includes a plurality of second additional fibers 330a. In one embodiment, the second additional fibers 330a are thermoplastic fibers, such as the thermoplastics listed above with reference to the third-type tow or yarn 230c of FIG. 2. In the illustrated embodiment, the second additional fibers 330a have substantially the same diameter as the additional fibers 320a. In an alternative embodiment (not shown), the additional fibers and second additional fibers have different diameters.

The second additional fibers 330a are randomly distributed throughout the rope 300a. This may be achieved by first braiding the tows of crystalline carbon fibers 310a and the tows of additional fibers 320a into a plurality of ropes, and then braiding the plurality of ropes with tows of the second additional fibers 330a into a single, larger rope 300a. Alternatively, the distribution may be achieved by simultaneously braiding all of the tows of crystalline carbon fibers 310a, additional fibers 320a, and second additional fibers 330a into a single rope 300a. In another alternative embodiment (not shown), the second additional fibers 320a are evenly distributed throughout the rope 300a.

The rope 300a also includes a sheath 340a. In one embodiment, the sheath 340a is constructed of thermoplastic, such as the thermoplastics listed above with reference to the third-type tow or yarn 230c of FIG. 2. In alternative embodiments, the sheath 340a may be constructed of PAN fibers, aramid fibers (such as Kevlar), or BN. The sheath 340a may be wound about the rope or woven or braided about the rope. Alternatively, the sheath 340a may encase the rope by a shrink wrapping process.

Figure 3B:
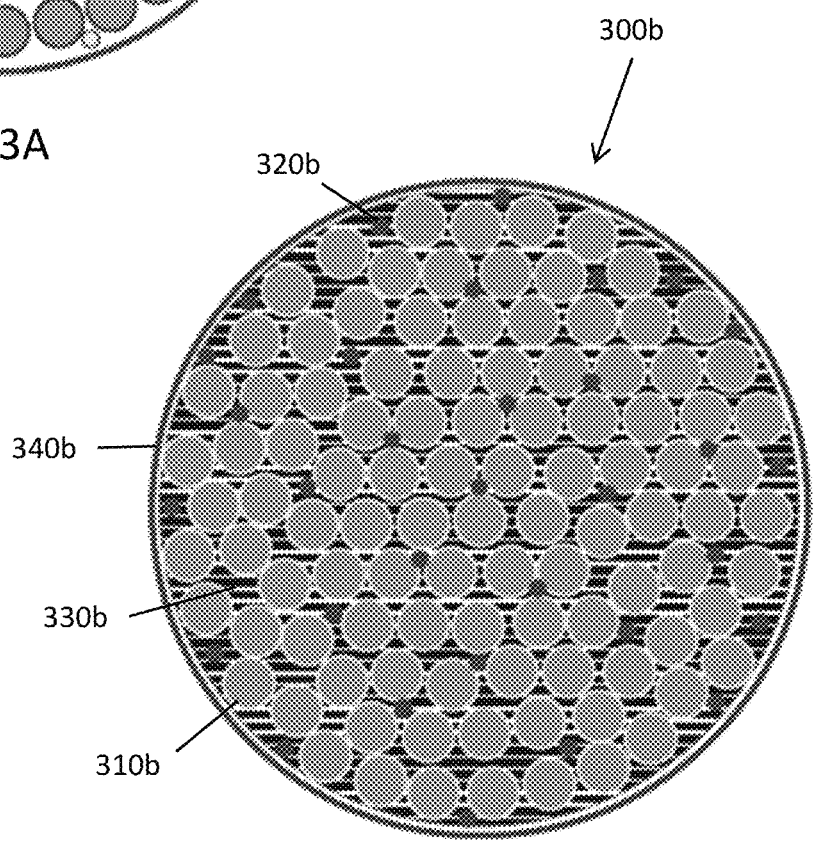

FIG. 3B illustrates a cross-section of an alternative embodiment of a crystalline carbon fiber rope 300b having a plurality of crystalline carbon fibers 310b. In one embodiment, the crystalline carbon fibers 310b are pitch fibers. In alternative embodiments, other crystalline carbon fibers may be employed, such as the alternatives listed above with reference to FIG. 1. The crystalline carbon fibers 310b may include multiple types of crystalline carbon fibers.

The crystalline carbon fiber rope 300b also includes a plurality of additional fibers 320b. In one embodiment, the additional fibers 320b are PAN fibers. In alternative embodiments, the additional fibers 320b are aramid fibers, thermoplastic fibers, or BN fibers.

In the illustrated embodiment, the additional fibers 320b have a substantially smaller diameter than the crystalline carbon fibers 310b. In one example, the crystalline carbon fibers 310b are provided in a 6K tow and the additional fibers 320b are provided in a 1K tow. In another example, the crystalline carbon fibers 310b are provided in a 12K tow and the additional fibers 320b are provided in a 3K tow. Other examples should be apparent to one of ordinary skill in the art. The crystalline carbon fibers 310b may be provided in 1K to 12K tow and the additional fibers 320b may be provided in 3K to 50K tow.

The additional fibers 320b are evenly distributed throughout the rope 300b. This may be achieved by first braiding the tows of crystalline carbon fibers 310b and the tows of additional fibers 320b into a plurality of ropes, and then braiding the plurality of ropes into a single, larger rope 300b. Alternatively, the distribution may be achieved by simultaneously braiding all of the tows of crystalline carbon fibers 310b and additional fibers 320b into a single rope 300b. In another alternative embodiment (not shown), the additional fibers 320b are randomly distributed throughout the rope 300b.

The crystalline carbon fiber rope 300b also includes a matrix 330b. In one embodiment, the matrix 330b is a resin. Alternatively, the matrix 330b is any thermoset, such as the thermosets listed above with reference to the resin bath 160 of FIG. 1. The matrix 330b may be formed by immersing the rope 300b in a resin bath, spraying the rope 300b, or infusing the tows or yarns prior to forming the rope. Alternatively, the matrix 330b may be formed during a coating process. In an alternative embodiment, thermoplastic or thermoset materials may be applied in a rolled sheet form.

The rope 300b also includes a sheath 340b. In one embodiment, the sheath 340b is constructed of thermoplastic, such as the thermoplastics listed above with reference to the third-type tow or yarn 230c of FIG. 2. In alternative embodiments, the sheath 340b may be constructed of PAN fibers, aramid fibers, or BN. The sheath 340b may be wound about the rope or woven or braided about the rope. Alternatively, the sheath 340b may encase the rope by a shrink wrapping process.

Figure 3C:
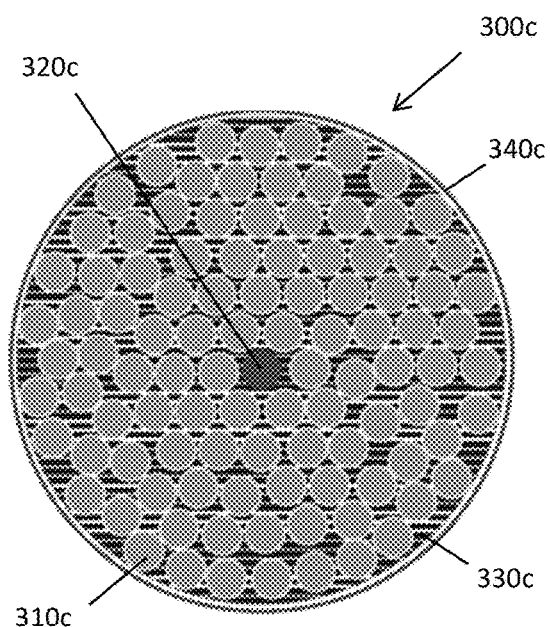

FIG. 3C illustrates a cross-section of another alternative embodiment of a crystalline carbon fiber rope 300c having a plurality of crystalline carbon fibers 310c. In one embodiment, the crystalline carbon fibers 310c are pitch fibers. In alternative embodiments, other crystalline carbon fibers may be employed, such as the alternatives listed above with reference to FIG. 1. The crystalline carbon fibers 310c may include multiple types of crystalline carbon fibers.

The crystalline carbon fiber rope 300c also includes a core 320c that is a tow of an additional fiber. In one embodiment, the core 320c is a tow of PAN fiber. In alternative embodiments, the core 320c is a tow of aramid fiber, thermoplastic fiber, or BN fiber.

In the illustrated embodiment, the core 320c has substantially the same diameter as the tows of crystalline carbon fibers 310c. In one example, the crystalline carbon fibers 310c and the core 320c are provided in a 6K tow. In another example, the crystalline carbon fibers 310c and the core 320c are provided in a 12K tow. Other examples should be apparent to one of ordinary skill in the art. The crystalline carbon fibers 310c and the core 320c may be provided in 1K to 50K tow.

The crystalline carbon fiber rope 300c also includes a matrix 330c. In one embodiment, the matrix 330c is a resin. Alternatively, the matrix 330c is any thermoset, such as the thermosets listed above with reference to resin bath 160 of FIG. 1. The matrix 330c may be formed by immersing the rope 300c in a resin bath, by spraying the rope 300c, or by infusing the tows or yarns prior to forming the rope. Alternatively, the matrix 330b may be formed during a coating process. In an alternative embodiment, thermoplastic or thermoset materials may be applied in a rolled sheet form.

The rope 300c also includes a sheath 340c. In one embodiment, the sheath 340c is constructed of thermoplastic, such as the thermoplastics listed above with reference to the third-type tow or yarn 230c of FIG. 2. In alternative embodiments, the sheath 340c may be constructed of PAN fibers, aramid fibers, or BN. The sheath 340c may be wound about the rope or woven or braided about the rope. Alternatively, the sheath 340c may encase the rope by a shrink wrapping process.

Figure 3D:
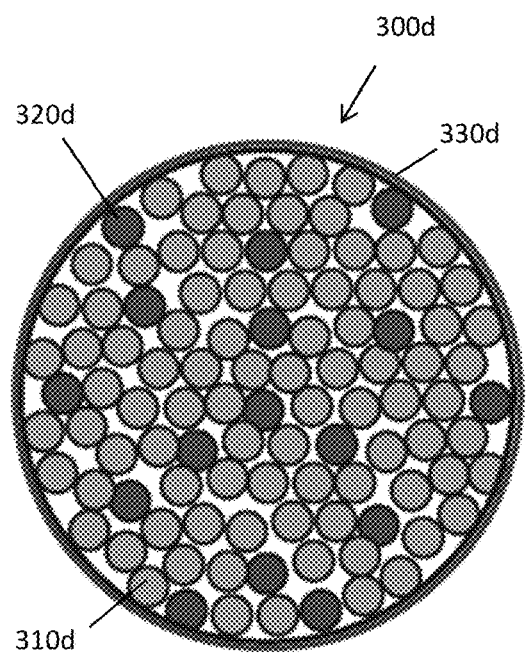

FIG. 3D illustrates a cross-section of still another alternative embodiment of a crystalline carbon fiber rope 300d having a plurality of crystalline carbon fibers 310d. In one embodiment, the crystalline carbon fibers 310d are pitch fibers. In alternative embodiments, other crystalline carbon fibers may be employed, such as the alternatives listed above with reference to FIG. 1. The crystalline carbon fibers 310d may include multiple types of crystalline carbon fibers.

The crystalline carbon fiber rope 300d also includes a plurality of additional fibers 320d. In one embodiment, the additional fibers 320d are PAN fibers. In alternative embodiments, the additional fibers 320d are aramid fibers, thermoplastic fibers, or BN fibers.

In the illustrated embodiment, the additional fibers 320d have substantially the same diameter as the crystalline carbon fibers 310d. In one example, the crystalline carbon fibers 310d and the additional fibers 320d are provided in a 6K tow. In another example, the crystalline carbon fibers 310d and the additional fibers 320d are provided in a 12K tow. Other examples should be apparent to one of ordinary skill in the art. The crystalline carbon fibers 310d and the additional fibers 320d may be provided in 1K to 50K tow.

In the illustrated embodiment, each of the crystalline carbon fibers 310d and the additional fibers 320d are coated with a resin. The resin may be any thermoset, such as the thermosets listed above with reference to resin bath 160 of FIG. 1. The resin coating may be formed by immersing each tow of crystalline carbon fiber 310d and additional fiber 320d in a resin bath, or by spraying each tow of crystalline carbon fiber 310d and additional fiber 320d. Alternatively, the coating may be formed by a quasi-isotropic process.

The rope 300d also includes a sheath 330d. In one embodiment, the sheath 330d is constructed of thermoplastic, such as the thermoplastics listed above with reference to the third-type tow or yarn 230c of FIG. 2. In alternative embodiments, the sheath 330d may be constructed of PAN fibers, aramid fibers, or BN.

The sheath 330d is coated with a resin. In the illustrated embodiment, the interior of the sheath 330d is coated with a resin. In an alternative embodiment (not shown), the exterior of the sheath 330d is coated with a resin. In another alternative embodiment (not shown), both the interior and the exterior of the sheath is coated with a resin. The resin may be any thermoset. The resin coating may be formed by immersing or spraying the sheath. Alternatively, the resin coating may be formed by a quasi-isotropic process.

The sheath 330d may be wound about the rope or woven or braided about the rope. Alternatively, the sheath 330d may encase the rope by a shrink wrapping process.

Figure 3E:
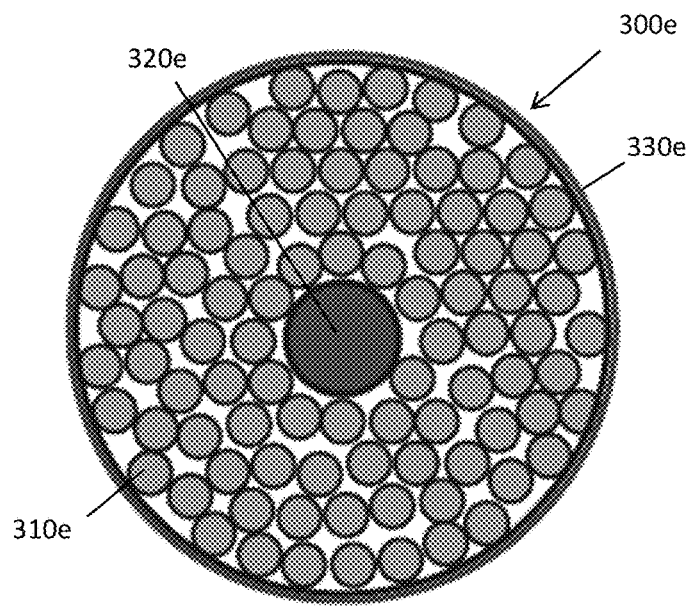

FIG. 3E illustrates a cross-section of yet another alternative embodiment of a crystalline carbon fiber rope 300e having a plurality of crystalline carbon fibers 310e. In one embodiment, the crystalline carbon fibers 310e are pitch fibers. In alternative embodiments, other crystalline carbon fibers may be employed, such as the alternatives listed above with reference to FIG. 1. The crystalline carbon fibers 310e may include multiple types of crystalline carbon fibers.

The crystalline carbon fiber rope 300e also includes a core that is a tow of an additional fiber 320e. In one embodiment, the additional fiber 320e is a PAN fiber. In alternative embodiments, the additional fiber 320e is an aramid fiber, thermoplastic fiber, or BN fiber.

In the illustrated embodiment, the additional fiber 320e has a substantially larger diameter than the crystalline carbon fibers 310e. In one example, the crystalline carbon fibers 310e are provided in a 1K tow and the additional fiber 320e is provided in a 6K tow. In another example, the crystalline carbon fibers 310e are provided in a 3K tow and the additional fiber 320e is provided in a 12K tow. Other examples should be apparent to one of ordinary skill in the art. The crystalline carbon fibers 310e may be provided in 3K to 50K tow and the additional fiber 320e may be provided in 1K to 12K tow.

In the illustrated embodiment, each of the crystalline carbon fibers 310e and the additional fibers 320e are coated with a resin. The resin may be any thermoset, such as the thermosets listed above with reference to resin bath 160 of FIG. 1. The resin coating may be formed by immersing each tow of crystalline carbon fiber 310e and additional fiber 320e in a resin bath, or by spraying each tow of crystalline carbon fiber 310e and additional fiber 320e.

The rope 300e also includes a sheath 330e. In one embodiment, the sheath 330e is constructed of thermoplastic, such as the thermoplastics listed above with reference to the third-type tow or yarn 230c of FIG. 2. In alternative embodiments, the sheath 330e may be constructed of PAN fibers, aramid fibers, or BN.

The sheath 330e is coated with a resin. In the illustrated embodiment, the interior of the sheath 330e is coated with a resin. In an alternative embodiment (not shown), the exterior of the sheath 330e is coated with a resin. In another alternative embodiment (not shown), both the interior and the exterior of the sheath is coated with a resin. The resin may be any thermoset. The resin coating may be formed by immersing or spraying the sheath. Alternatively, the resin coating may be formed by a quasi-isotropic process.

The sheath 330e may be wound about the rope or woven or braided about the rope. Alternatively, the sheath 330e may encase the rope by a shrink wrapping process.

It should be understood that any of the above described components may be used in any of the other described embodiments. For example, the large, resin-coated core of additional fiber 320e from FIG. 3E may be used in any of the embodiments shown in FIGS. 3A-3D. As another example, the resin coated sheath 330d from FIG. 3D may be used in any of the embodiments shown in FIGS. 3A-3C. Other such combinations should be apparent to a person of ordinary skill in the art.

In an alternative embodiment (not shown), the crystalline carbon fibers may be co-mingled with any thermoplastic for later melt and impregnate applications. In other embodiments, BN filled ABS may be added to a thermoset vinyl ester matrix or composite compound and melded together. BN can be used as filler in any matrix contemplated. Additionally, any of the fibers may be coated with graphene oxide for enhanced mechanical strength, electrical conductivity, and thermal properties. Almost any thermoplastic or thermoset composite can be coated with graphene oxide for enhanced mechanical strength, electrical conductivity, and thermal properties.

In any of the embodiments described above with reference to FIGS. 3A-3E, metallic yarn may also be co-mingled with the other fibers in the rope. Exemplary metals include, without limitation: aluminum (including Al 1145, Al 3003, and Al 1100), brass (including brass 260, brass 70-30, brass 80-20, and brass 85-15), bronze (including bronze 90), cadmium, copper, gold, hastiloy (including hastiloy x), haynes (including haynes 214), inconell (including inconell 600), iron, lead, magnesium, molybdenum, nickel (including Ni 201 and Ni 899L), niobium, palladium, platinum, platinum clad niobium, silver, steel (including SS 304L, SS 316L, SS 444, and steel 1008), tantalum, titanium, zinc (including zinc 500), and zirconium.

Additionally, in any of the embodiments described above with reference to FIGS. 3A-3E, the yarns or tows may be combined with carbon nano-tubes or carbon nano fiber to improve thermal interfacing. Additionally, the tows or yarns may be highly graphitized or combined with other pyrolytic graphite materials to either improve costs or improve thermal interfacing.

While FIGS. 3A-3E show ropes having a generally circular cross-section, in alternative embodiments (not shown), the rope may have a triangular, square, rectangular, or quadrilateral cross-section. In other alternative embodiments (not shown), the rope may have a cross-section of any geometric shape.

In one embodiment, after a crystalline carbon fiber rope has been formed, multiple ropes or rope segments may be laid next to each other in a uni-directional format. The ropes are rope segments may then be compressed into a sheet or block. After the uni-directional fibers are laid next to each other and compressed into a sheet, the material can then be cut into strips and used as thermal fins to draw heat away from the hot components. Such sheets, blocks, or strips may also be molded into any desired shape.

Figures 4A, 4B:
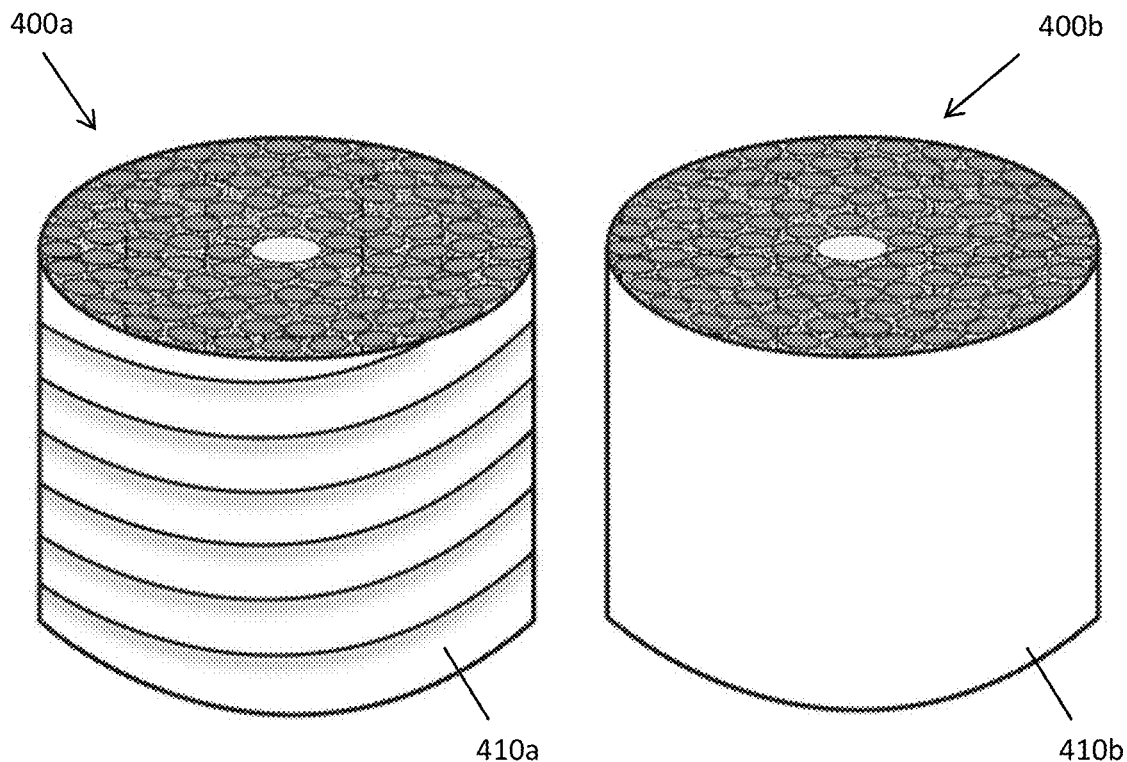
FIGS. 4A-4C illustrate perspective views of exemplary embodiments of crystalline carbon fiber rope segments.
Figure 4C:
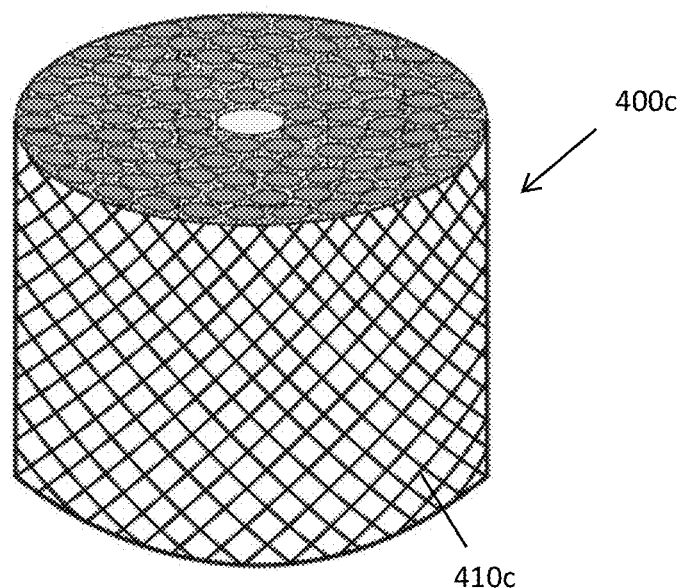

In an alternative embodiment, after a crystalline carbon fiber rope has been formed, it may be cut into a plurality of crystalline carbon fiber rope segments. FIGS. 4A-4C illustrate perspective views of exemplary embodiments of crystalline carbon fiber rope segments 400. The crystalline carbon fiber rope may be formed by any of the methods described above in relation to FIGS. 1 and 2 above, and may have any of the constructions described above in relation to FIGS. 3A-3E. In one embodiment, the crystalline carbon fiber rope is cut into 1 inch (2.5 cm) segments. In alternative embodiments, the crystalline carbon fiber rope may be cut into 0.039 inch to 5 inch (0.010 to 13 cm) segments. It should be understood that the rope segments may be cut to any desirable length.

In FIG. 4A, the crystalline carbon fiber rope segment 400a is covered by a wound filament 410a. In FIG. 4B, the crystalline carbon fiber rope segment 400b is covered by a solid sheath 410b. In FIG. 4C, the crystalline carbon fiber rope segment 400c is covered by a braided sheathing 410c.

Figure 5A:
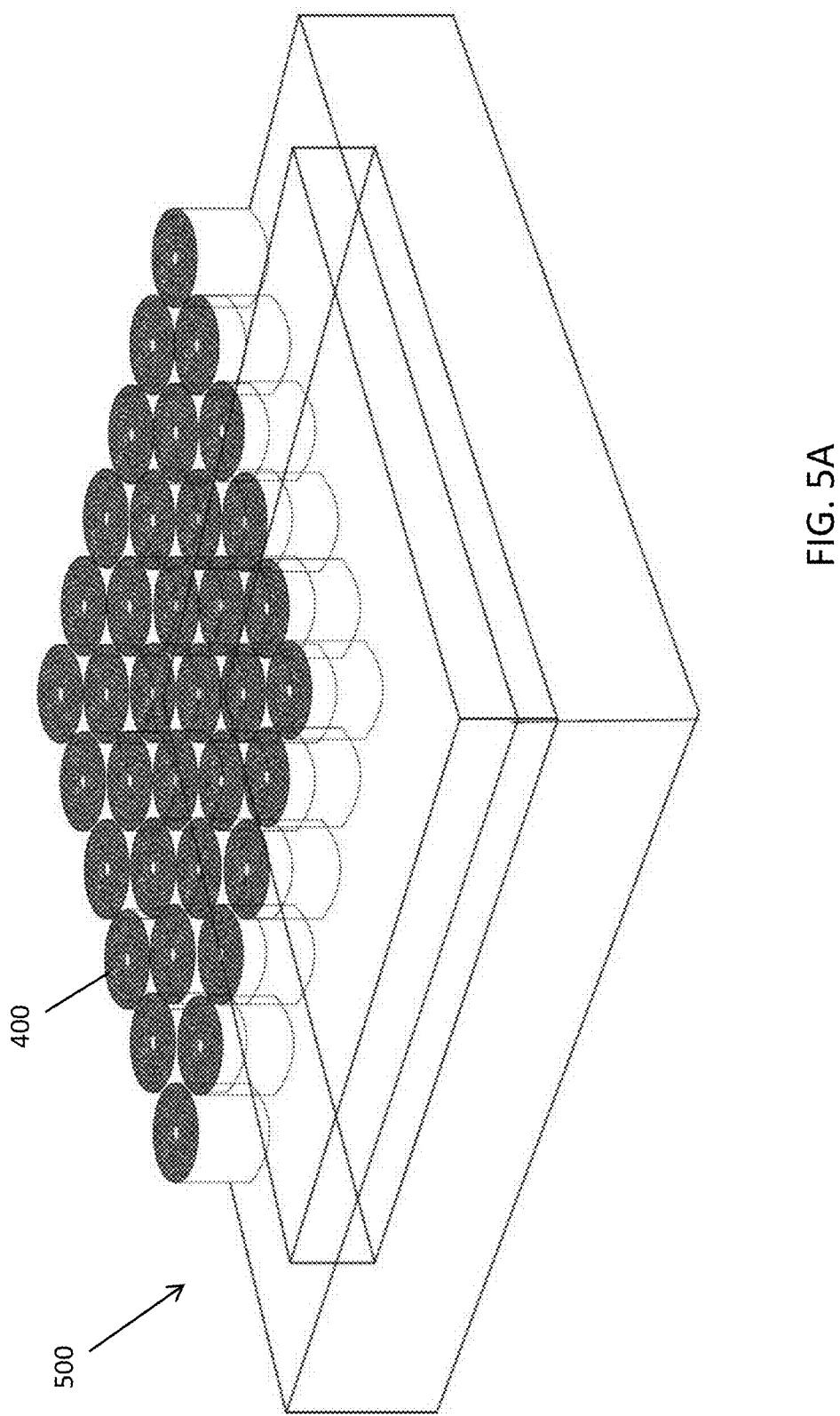
FIGS. 5A-5N are schematic drawings illustrating perspective and top views of crystalline carbon fiber rope segments in multiple embodiments of molds 500, and of webbing used to hold the crystalline carbon fiber rope segments in a desired orientation.

FIGS. 5A-5M are schematic drawings illustrating views of crystalline carbon fiber rope segments 400 in a mold 500. The crystalline carbon fiber rope segments 400 may be formed from any of the crystalline carbon fiber ropes discussed above. As shown in FIG. 5A, the crystalline carbon fiber rope segments 400 are placed in a cavity of the mold 500 such that the fibers extend in substantially the same direction, and each segment 400 contacts at least one adjacent segment. While the illustrated mold 500 has a cavity substantially defined by five surfaces, it should be understood that the cavity may have any number of surfaces. In the illustrated embodiment, the mold 500 is a compression mold. In an alternative embodiment (not shown), the mold may be an injection mold.

As shown in FIGS. 5B-5F, to aid in the placement of the crystalline carbon fiber rope segments 400, a net or webbing 510 may be employed. FIG. 5B illustrates a top view of a webbing 510a formed by single filaments of fiber that are woven together. FIG. 5C illustrates a close-up perspective view of the webbing 510a. The webbing may be formed of nylon, ABS, aramid fiber, carbon, spectra fiber, dyneema, or basalt fiber. However, it should be understood that any material may be employed.

FIG. 5D illustrates a top view of a webbing 510b formed by braided or twisted filaments that are then woven together. The filaments may be constructed of the same material described above for webbing 510a. In an alternative embodiment (not shown), the webbing may be formed of a rope of filaments.

Figure 5E:
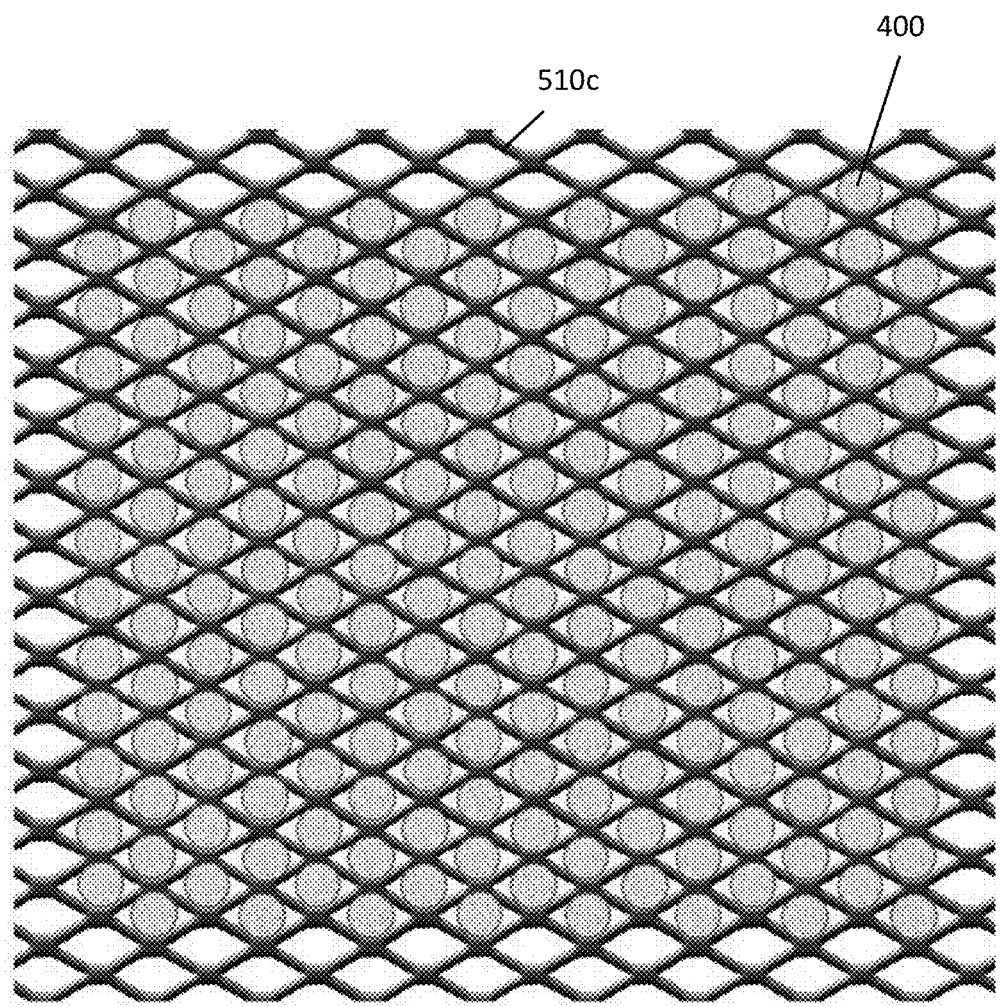

While FIGS. 5B-5D illustrate simple webbings having square openings, it should be understood that more complex webbings may be employed. FIG. 5E illustrates a top view of one such webbing 510c, which has diamond-shaped openings. The webbing 510c may be formed by a molding process or an additive manufacturing process such as 3D printing. The webbing 510c may be formed of the same materials discussed above for webbing 510a.

Figure 5F:
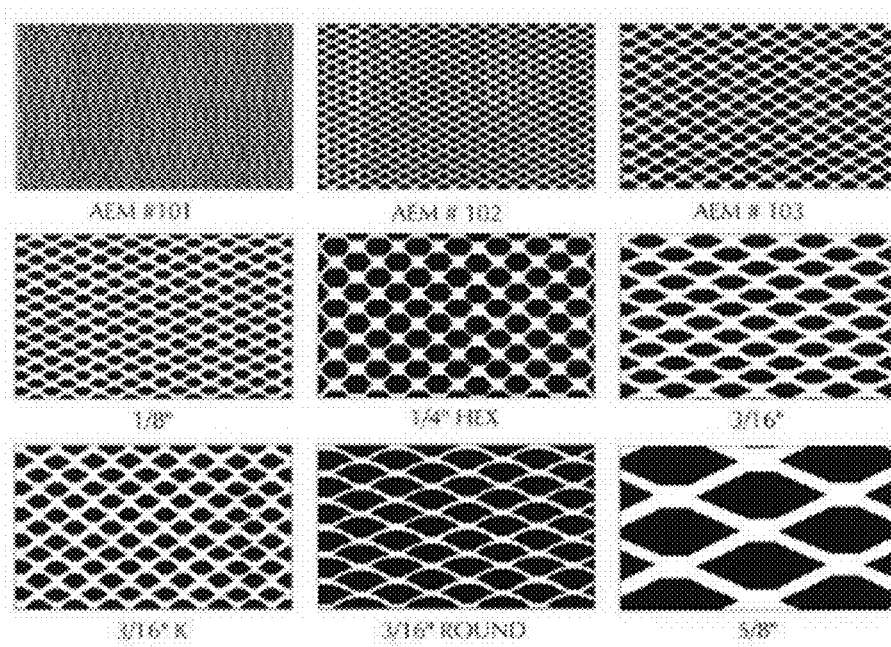

FIG. 5F illustrates top views of several other possible webbing formations. It should be understood that these examples are not limiting, but are merely provided for additional context.

In any of the above-described embodiments, it is envisioned that the webbing 510 may be provided on a roll or in rectangular sheets. The webbing may then be cut to shape to fit in the mold. Alternatively, the webbing may be manufactured to fit the mold, thereby reducing waste.

In certain instances, it may be desirable to employ multiple sheets of webbing, stacked on top of each other. The multiple sheets of webbing may aid in keeping the crystalline carbon fiber rope segments in a desired position.

In one embodiment, the webbing is placed in the mold before the crystalline carbon fiber rope segments are inserted. In an alternative embodiment, the crystalline carbon fiber rope segments are first inserted into webbing that is in the desired shape. The webbing and crystalline carbon fiber rope segments are then placed in the mold together at the same time. This method may help increase throughput when multiple components are being molded.

In one embodiment, the webbing is merely used to initially align the crystalline carbon fiber rope segments, and the webbing is removed before the molding process begins. Alternatively, the webbing can remain in place during the molding process and the material of the webbing becomes incorporated into the final molded product.

Figure 5G:
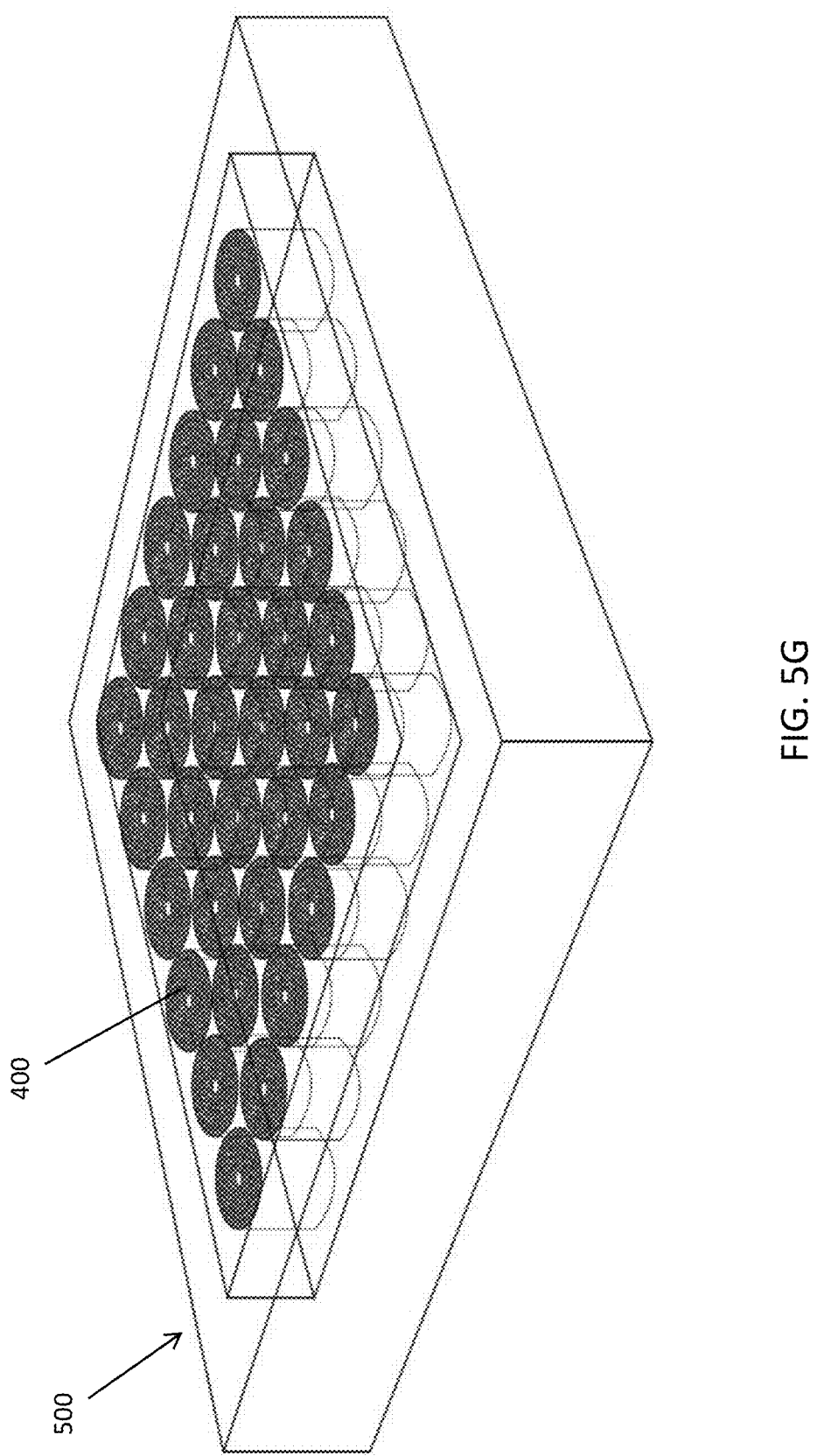

After the crystalline carbon fiber rope segments 400 are placed in the mold 500, a surface of the mold is heated, causing bottom portions of the crystalline carbon fiber rope segments 400 to become less viscous. As shown in FIGS. 5G and 5H, after the crystalline carbon fiber rope segments 400 are loaded into the mold 500 a top 520 of the mold 500 is closed on top of the crystalline carbon fiber rope segments 400. The top 520 includes a plurality of shaped surfaces that define inverse features of the final molded product. In the illustrated embodiment, the top 520 includes a plurality of fins 530. In alternative embodiments, the top may have more complex features. Additionally, the other surfaces of the mold may have additional features.

In one embodiment, as the top 520 is closed, the closure rate slows. When the top contacts the crystalline carbon fiber rope segments 400, pressure begins to build and the top portions of the crystalline carbon fiber rope segments 400 heat and becomes less viscous. The hot, low viscosity material of the crystalline carbon fiber rope segments 400 begins to flow, taking the line of least resistance. At the same time, the cooler, stiffer material that is left behind is compressed and pushed outward.

When the mold is fully closed, the pressure builds up until a predetermined molding pressure is reached. The material then cures inward from the edges. The material is held under pressure until the part is cured. The mold may include one or more bladders that expand to provide pressure on the component from an internal surface. After the part is cured, the top 520 is opened and the part is ejected from the mold 500. Ejector pins (not shown) may be employed to eject the part without causing damage.

In an alternative embodiment (not shown), the crystalline carbon fiber segments may be surrounded and encapsulated by thermoplastic or thermoset materials during the molding process. Additionally, the crystalline carbon fiber segments may be utilized in high-volume applications in injection mold or hybrid injection processes.

Figure 5I:
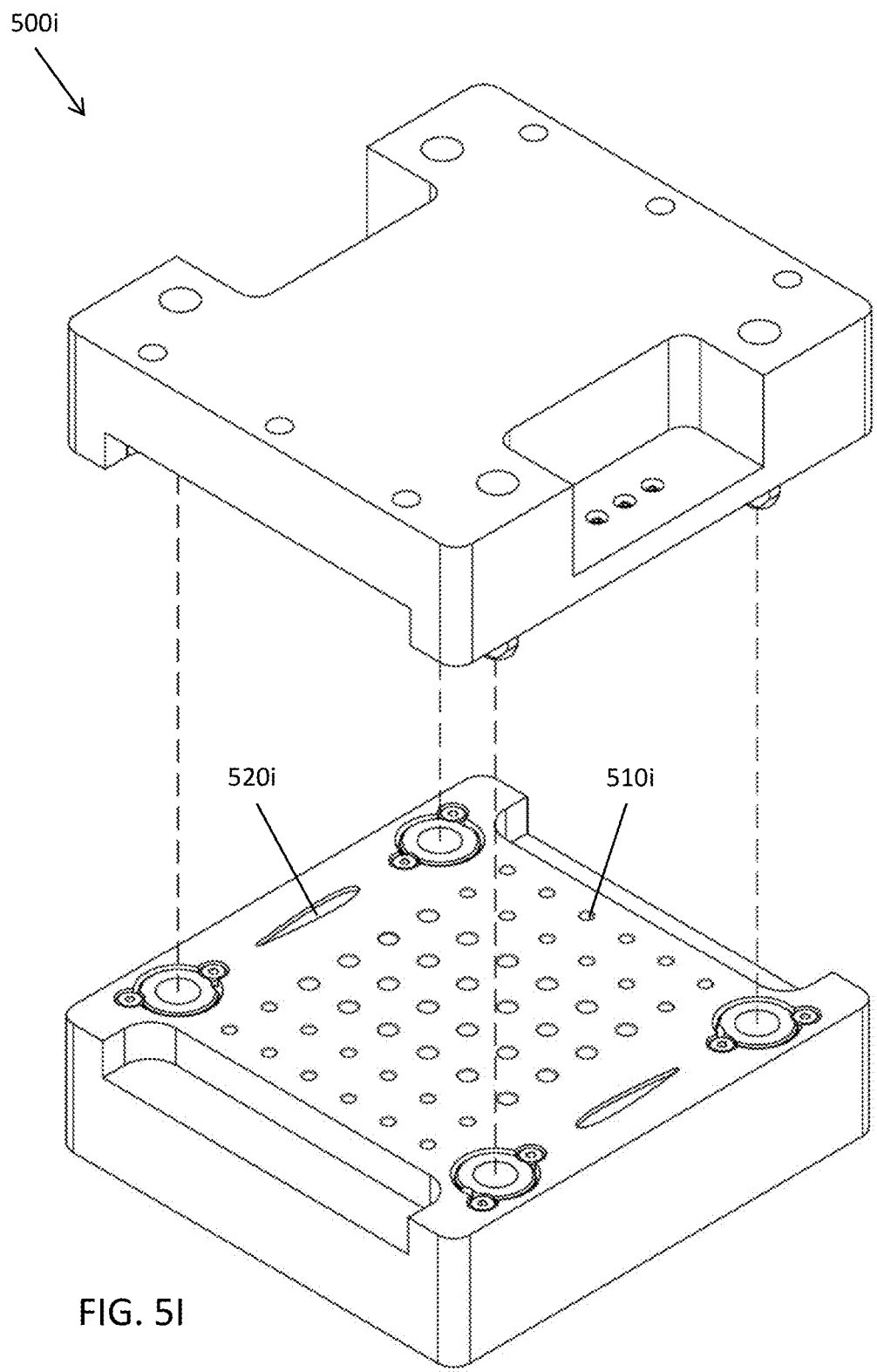

FIG. 5I illustrates a perspective view of an alternative embodiment of a mold 500i. The mold 500i includes a plurality of first openings 510i configured to mold heat pins, and a plurality of second openings 520i configured to mold heat blades. The plurality of first and second openings 510i, 520i are filled with molding material. For example, the plurality of first and second openings 510i, 520i may be filled with crystalline carbon fiber rope segments. Alternatively, the plurality of first and second openings 510i, 520i may be filled with a metallic substance. In one known embodiment, the plurality of first and second openings 510i, 520i are filled with crystalline carbon fiber rope segments having a metallic core. In another known embodiment, plurality of first and second openings 510i, 520i are filled with crystalline carbon fiber rope segments, and a metallic insert is added after the molding process is completed.

Figure 5J:
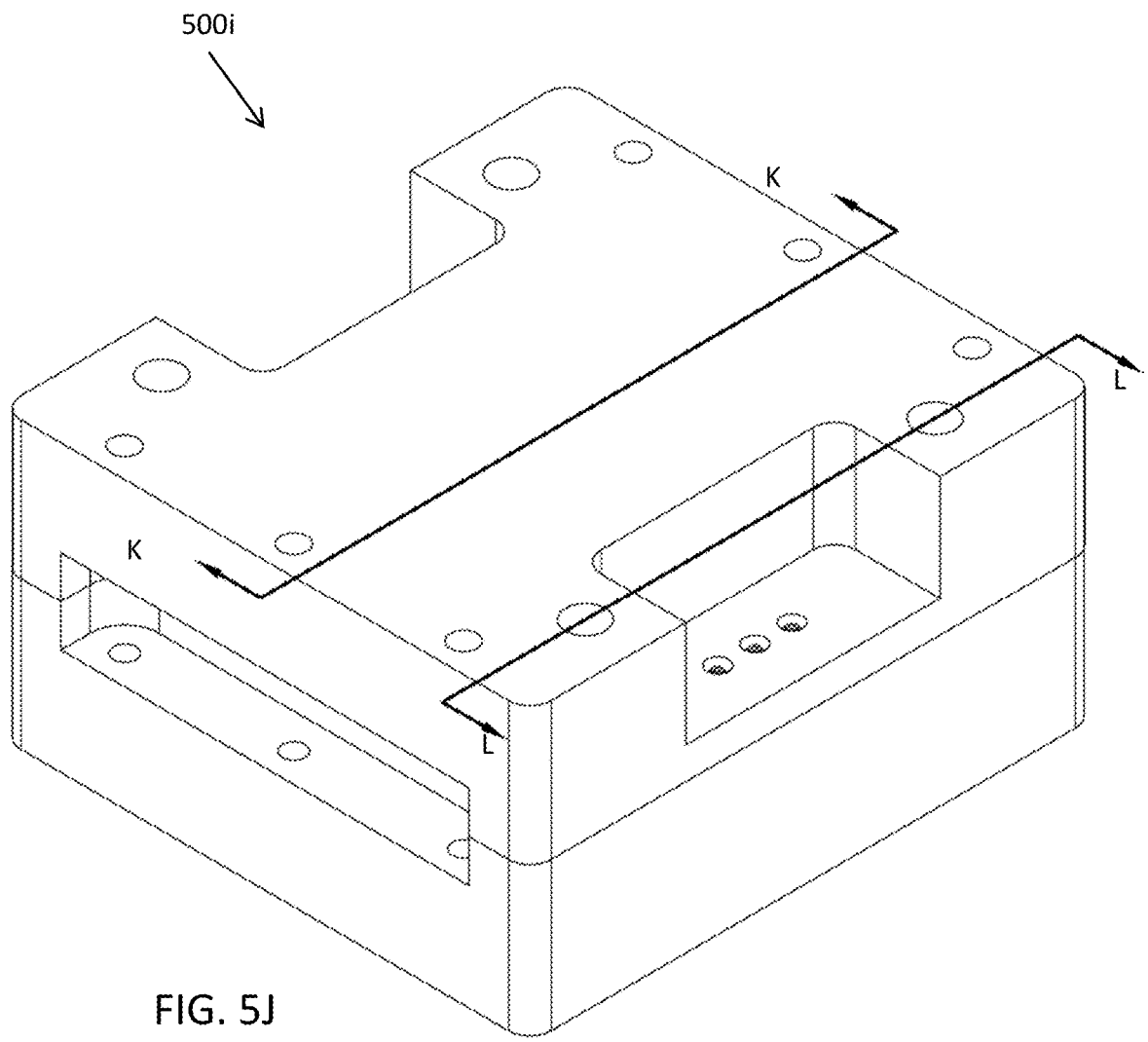

FIG. 5J illustrates the mold 500i in a closed position. The mold 500i is heated in the manner described above.

Figure 5K:
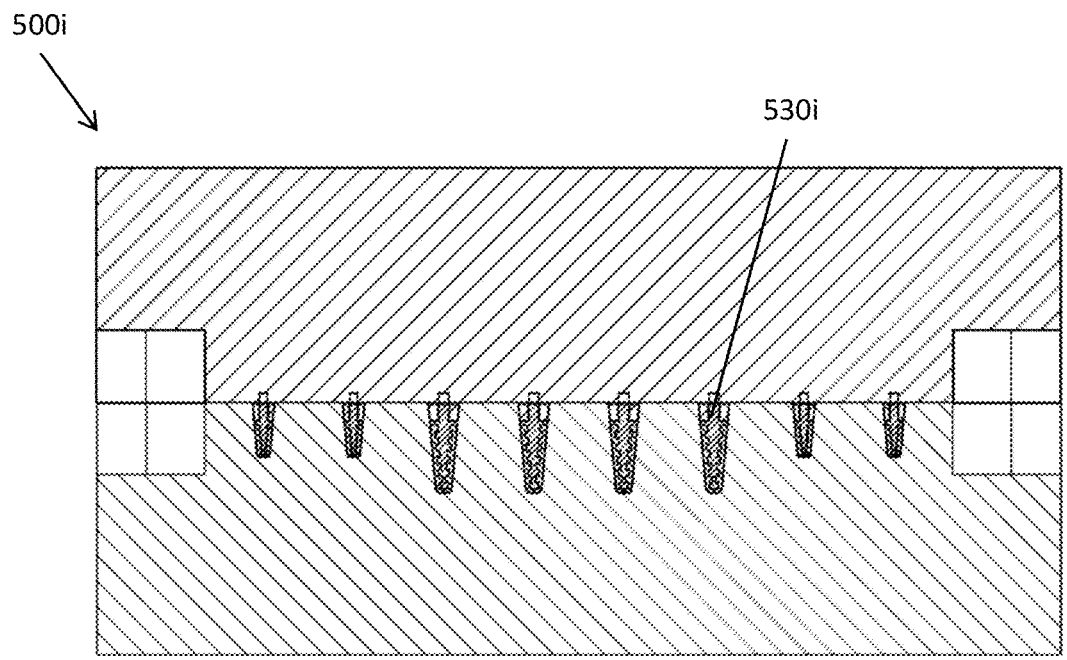

FIG. 5K illustrates a cross-section of the mold 500i taken along line K-K in FIG. 5J. As can be seen from this view, a plurality of heat pins 530i are being formed in the first openings 510i.

Figure 5L:
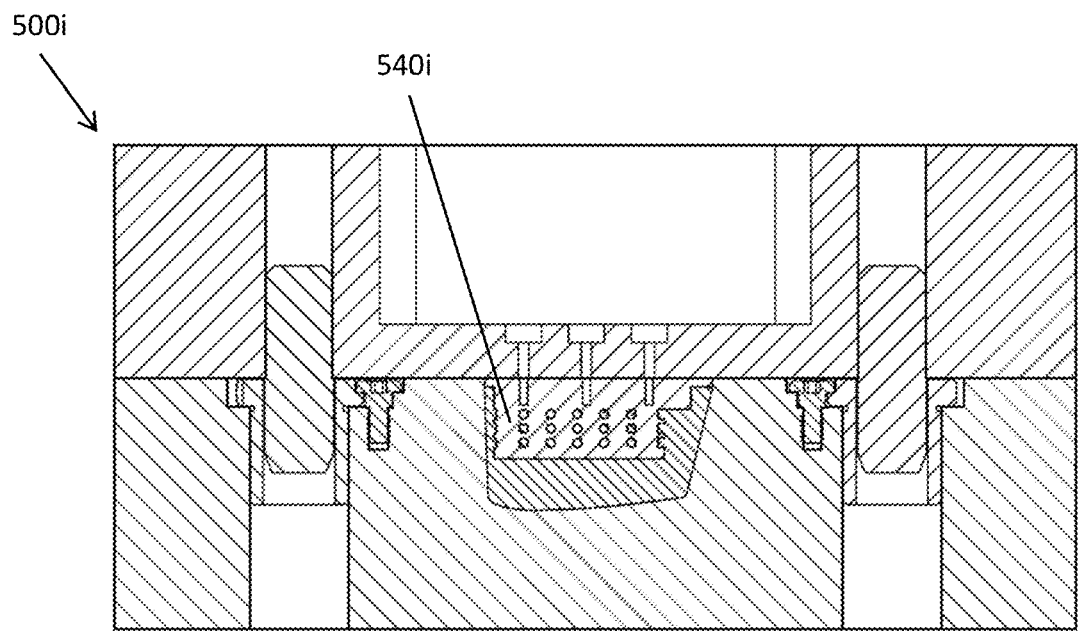

FIG. 5L illustrates a cross-section of the mold 500i taken along line L-L in FIG. 5J. As can be seen from this view, a plurality of heat blades 540i are being formed in the second openings 520i.

Figure 5M:
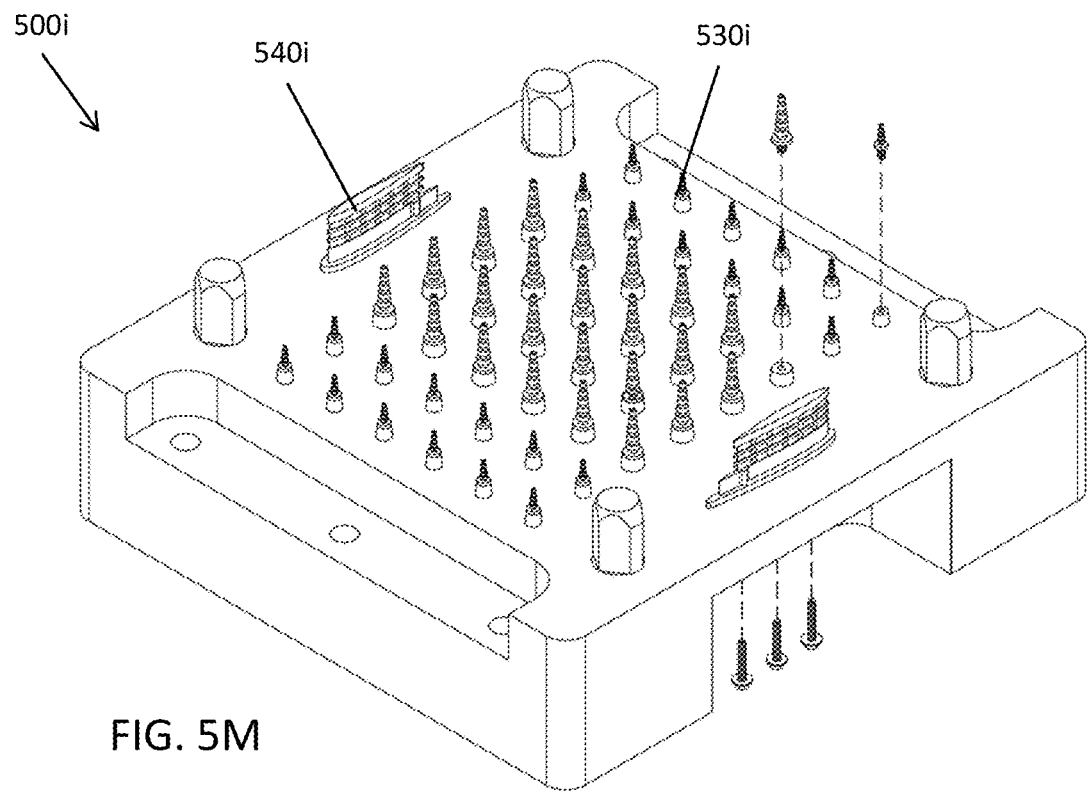

FIG. 5M illustrates a perspective view of the mold 500i in an open position after the molding process is complete. The plurality of heat pins 530i and heat blades 540i have been formed and may be removed from the mold.

A more complete description of FIGS. 5I-5M may be found in U.S. patent application Ser. No. 14/710,490, filed on May 12, 2015 by Rapid Unmanned Aerial Systems, LLC, the disclosure of which is incorporated by reference herein in its entirety.

Figure 6:
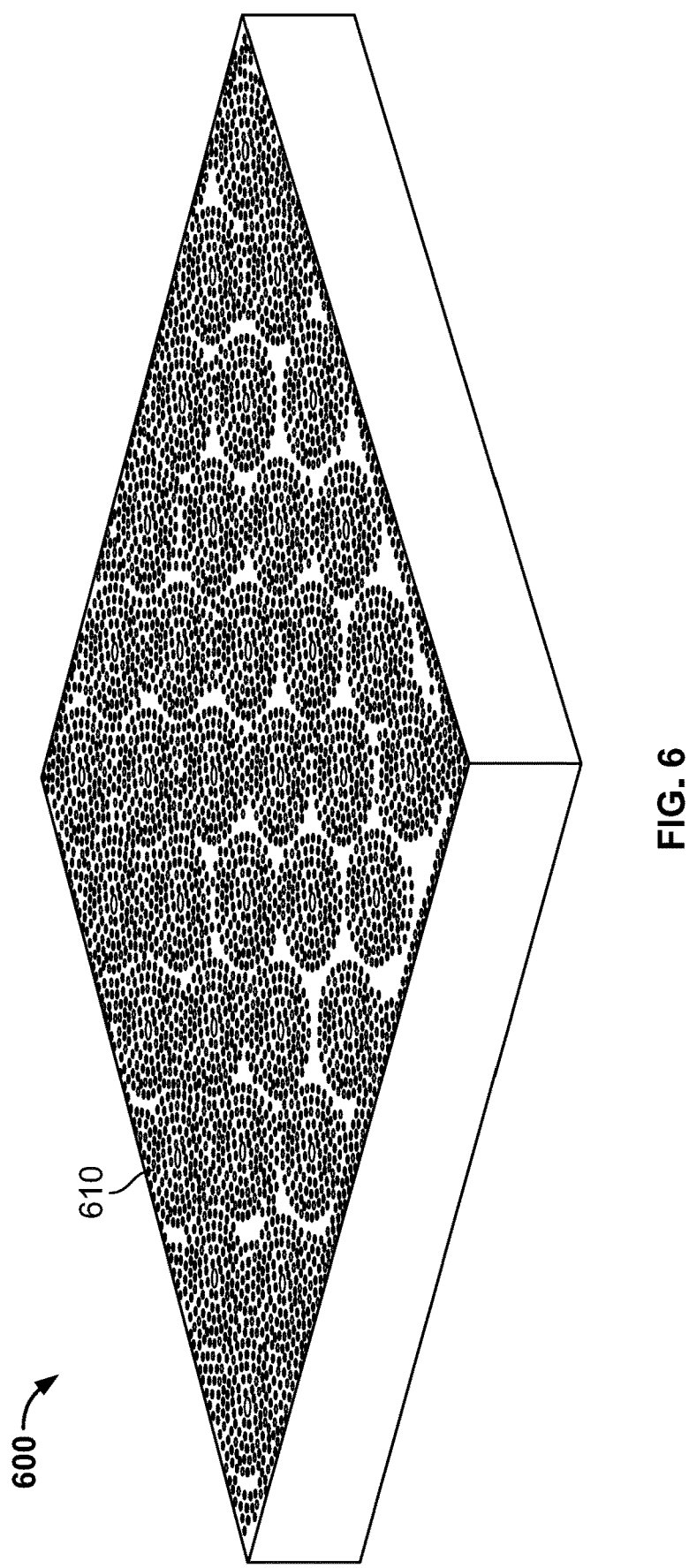
FIG. 6 is a schematic drawing of a component in the process of being formed by the mold 500.

FIG. 6 is a schematic drawing of a component 600 in the process of being formed by a mold 500. As can be seen in the illustrated embodiment, the component 600 includes a plurality of fibers 610 extending in substantially the same direction (i.e., from top to bottom). By aligning the fibers in this manner, the component 600 may more effectively transfer heat between the top surface and bottom surface. By contrast, heat may not be transferred as effectively in a lateral direction.

Figure 5N:
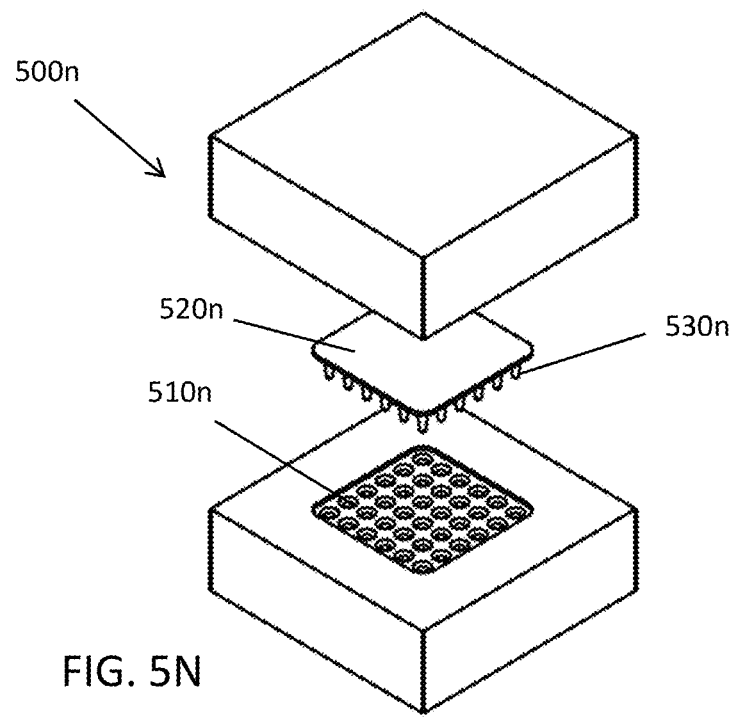

FIG. 5N illustrates a perspective view of an alternative embodiment of a mold 500n. The mold 500n includes a plurality of openings 510n configured to mold a plate 520n having a plurality of smooth heat pins 530n. The openings 510n are filled with molding material. For example, the openings 510n may be filled with crystalline carbon fiber rope segments. Alternatively, the openings 510n may be filled with a metallic substance. In one known embodiment, the openings 510n are filled with crystalline carbon fiber rope segments having a metallic core.

Because the component 600 is still in the process of being formed, some of the rope segments are at a lower temperature and have still maintained a distinct shape. By contrast, in the circled area, the rope segments have been heated sufficiently so that they have lost their form and individual strands are moving towards each other. As the molding process continues, the fibers will become more equally distributed throughout the component, and distinct segment shapes will no longer be visible.

Figure 7:
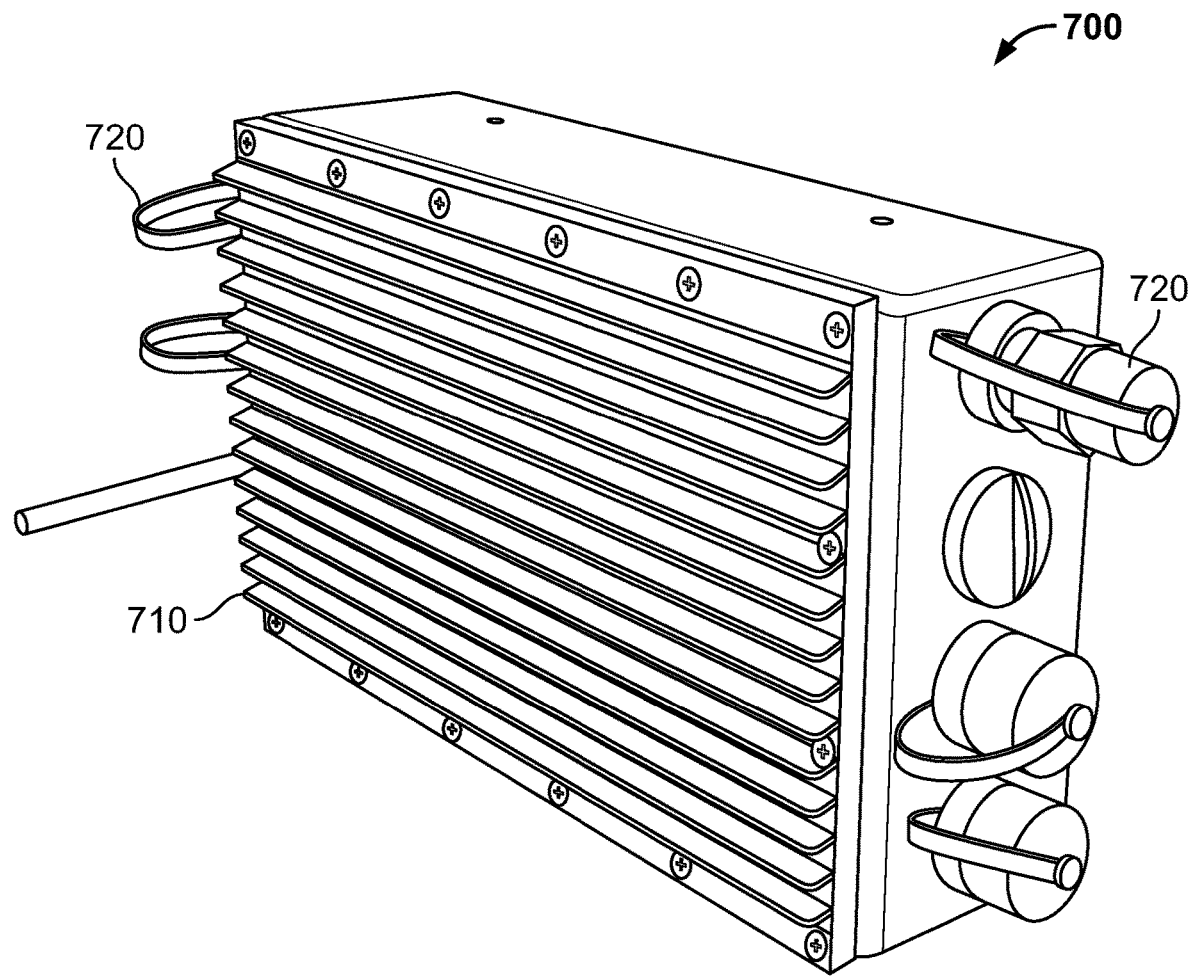
FIG. 7 illustrates a perspective view of an exemplary component formed by compression molding a plurality of crystalline carbon fiber rope segments.
Figure 8:
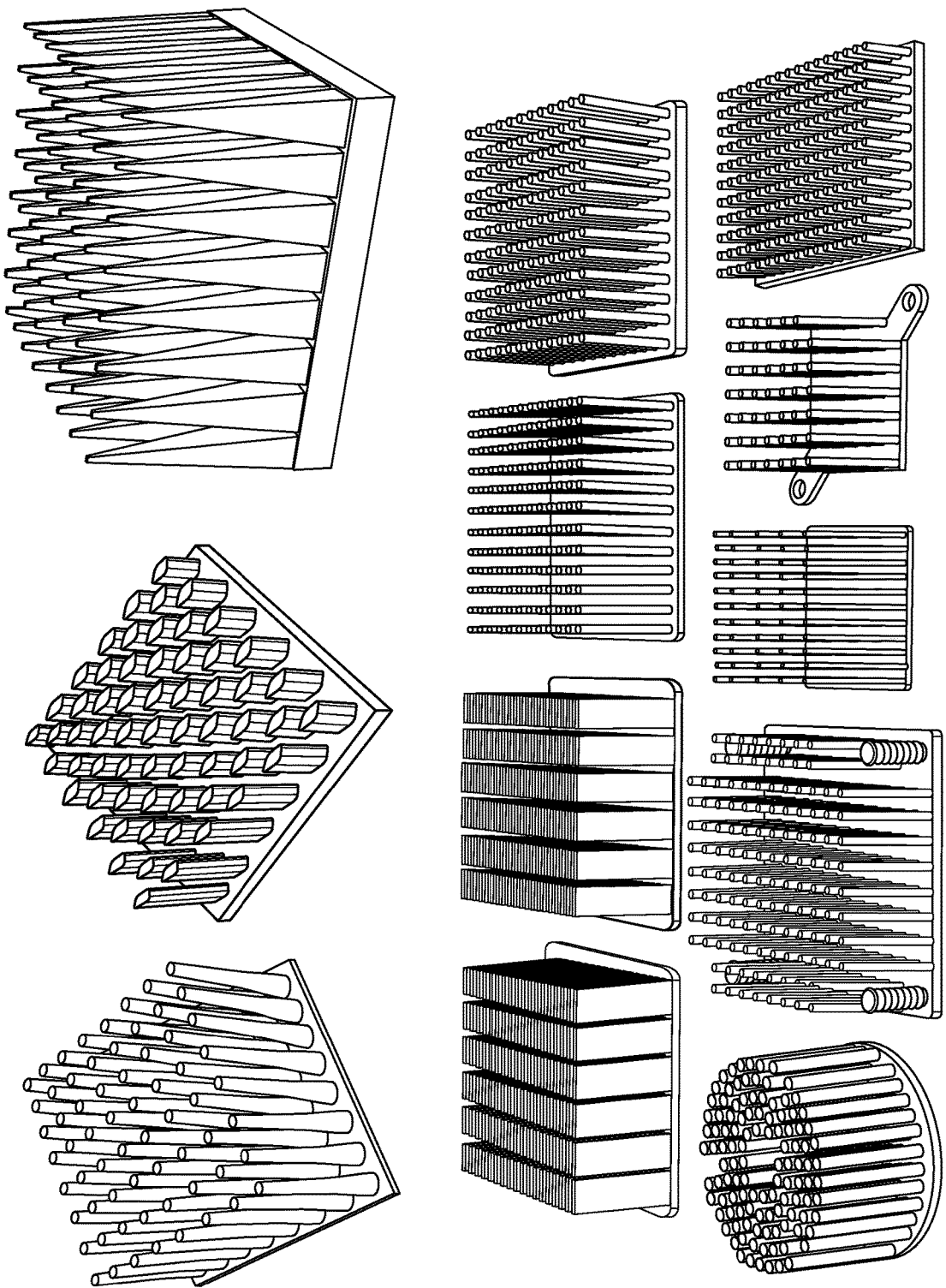
FIG. 8 illustrates perspective views of exemplary components formed by compression molding a plurality of crystalline carbon fiber rope segments.

While the component 600 shown in FIG. 6 is substantially cuboid, it should be understood that this is merely for illustrative purposes. Components formed in the manner described herein may take any shape, including simple shapes and highly complex shapes. FIG. 7 illustrates one such example of a complex component 700. The component 700 includes a plurality of fins 710 and other projections 720. FIG. 8 illustrates additional examples of cooling fins and cooling pins that may be formed in the manner described above. FIGS. 9 and 10 illustrate additional examples of complex components 900, 1000 that may be formed in the manner described above.

Figure 11A:
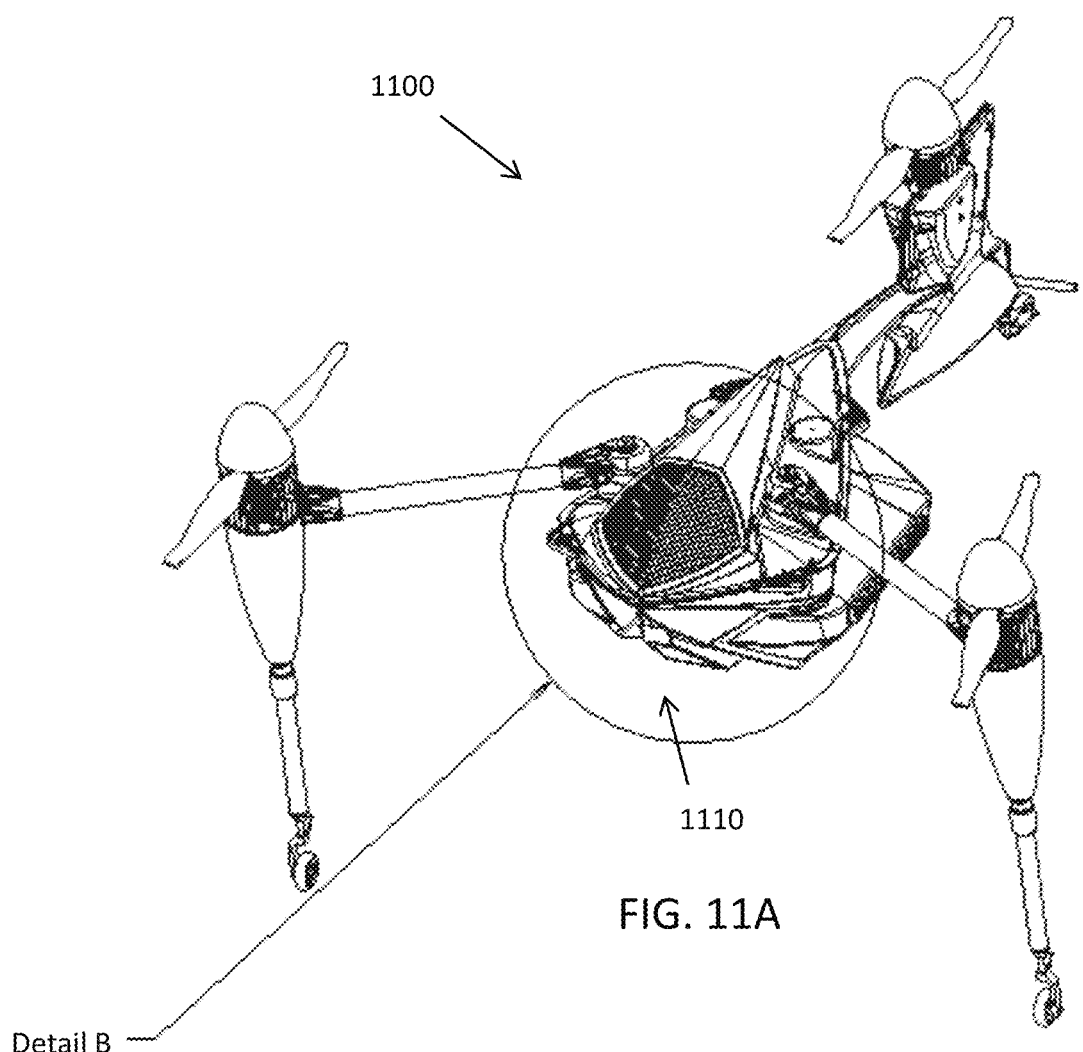
FIGS. 11A-11C illustrate perspective views and detail views of an exemplary aerial vehicle having components formed by compression molding a plurality of crystalline carbon fiber rope segments.
Figure 11B:
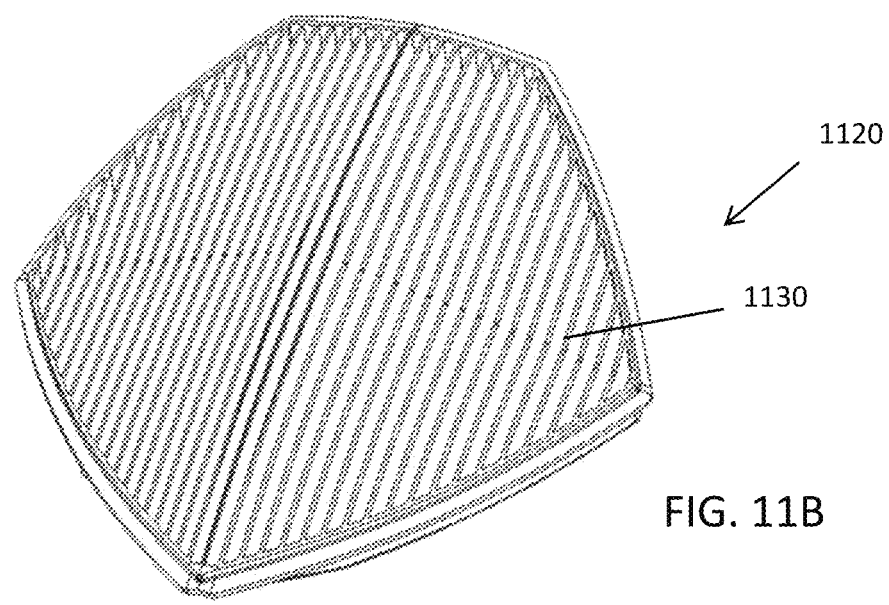
Figure 11C:
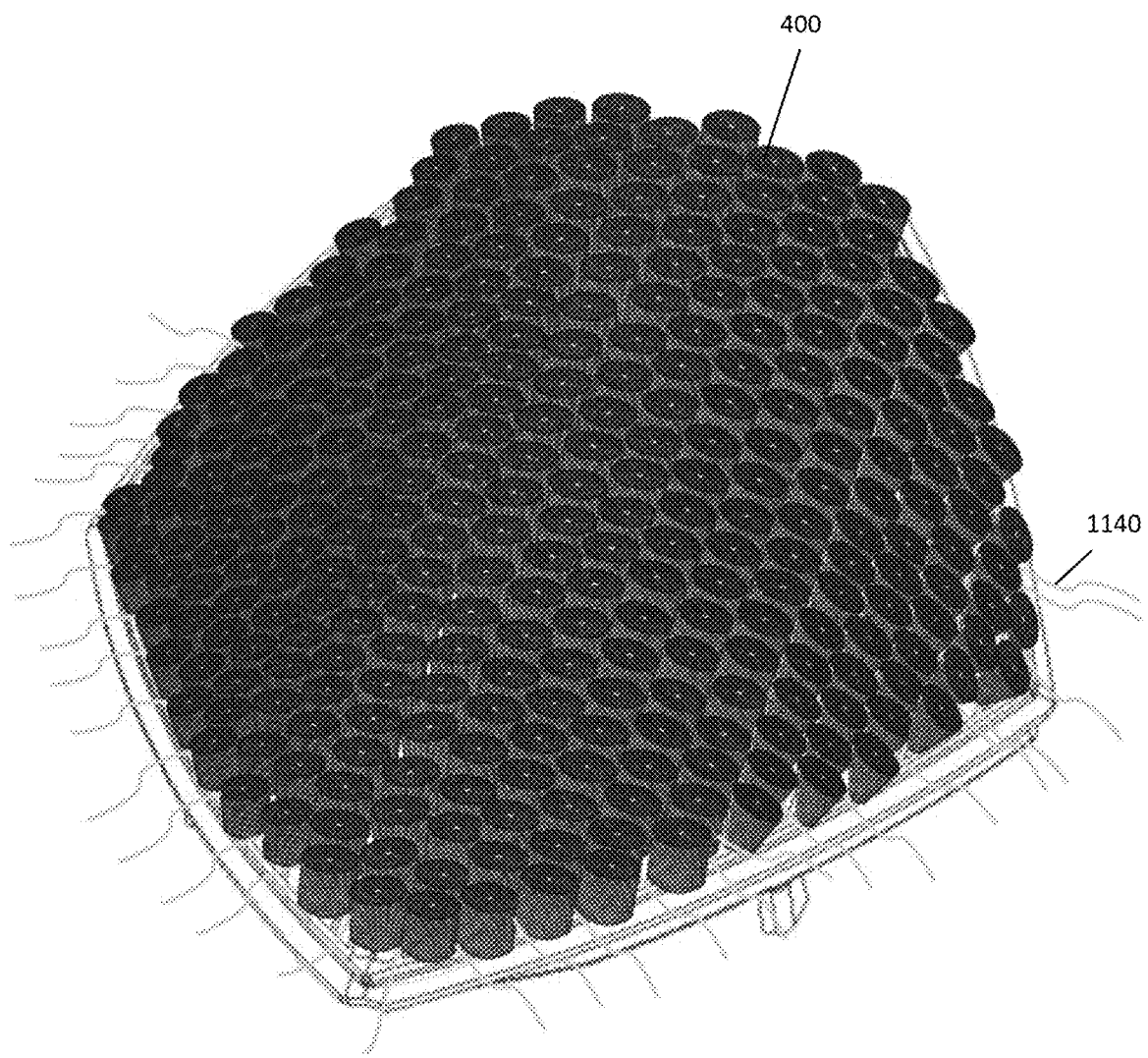

FIGS. 11A-11C illustrate a perspective view and detail views, respectively, of an exemplary aerial vehicle having components formed by compression molding a plurality of crystalline carbon fiber rope segments. FIG. 11A illustrates a perspective view of one embodiment of an unmanned aerial vehicle 1100 having a composite heat sink integral with a front fuselage 1110. In the illustrated embodiment, the front fuselage 1110 includes a fuselage grating 1120. As shown in the detail view of FIG. 11B, the fuselage grating 1120 includes a plurality of elongated fins 1130. The fuselage grating 1120 may be constructed of the same materials and in the same manner described above. For example, FIG. 11C illustrates a perspective view of a plurality of crystalline carbon fiber rope segments 400 that are held in a desired orientation by a webbing 1140. The crystalline carbon fiber rope segments 400 and webbing 1140 may then be molded into the shape of the fuselage grating 1120. Additional post-process machining may also be employed to give the component its final shape.

Figure 12A:
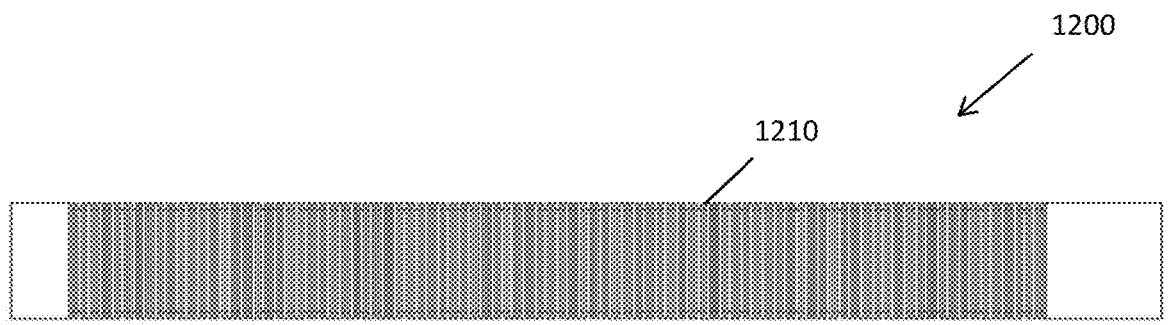
FIGS. 12A-12C illustrate top and perspective views of an exemplary gun barrel formed by compression molding a plurality of crystalline carbon fiber rope segments.
Figure 12B:
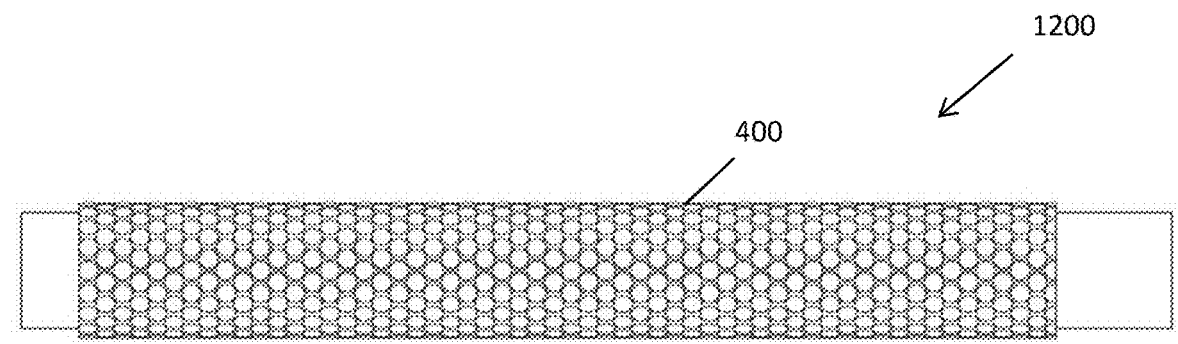
Figure 12C:
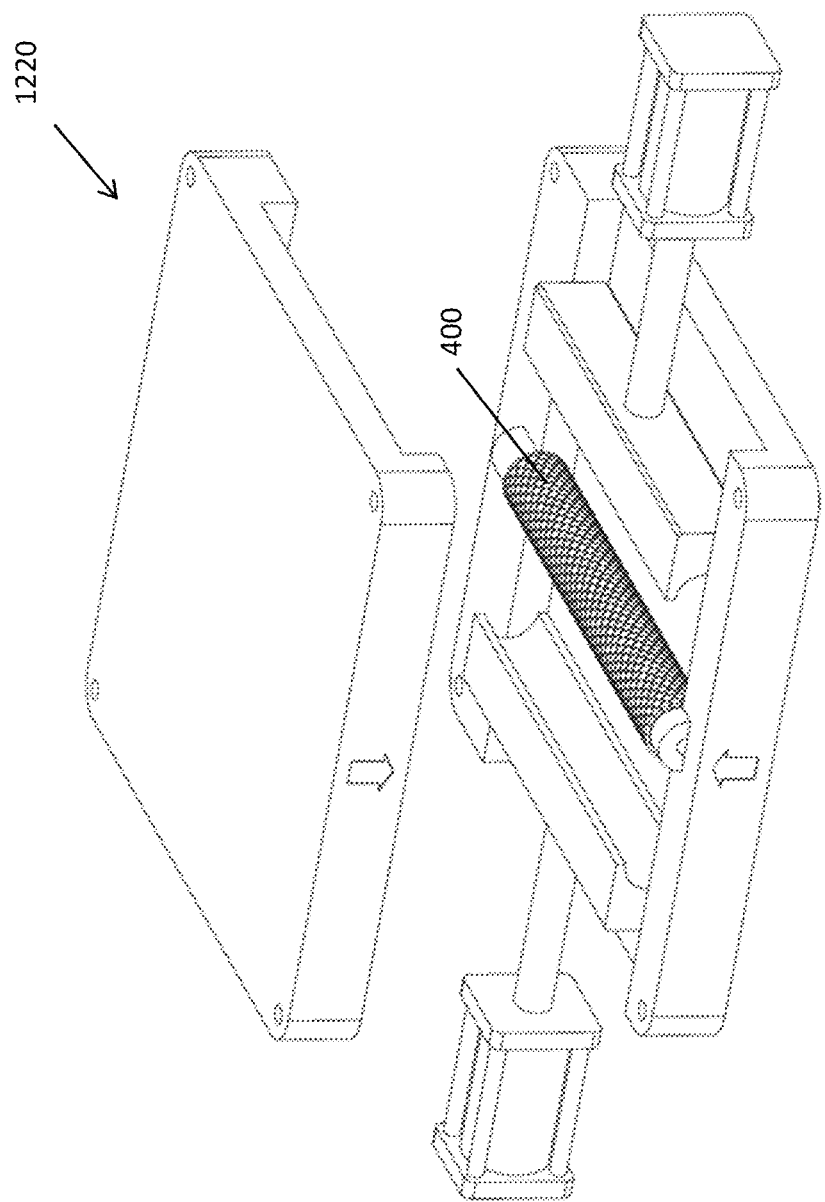

FIGS. 12A-12C illustrate a perspective view and detail views, respectively, of an exemplary gun barrel formed by compression molding a plurality of crystalline carbon fiber rope segments. FIG. 12A illustrates a perspective view of one embodiment of a gun barrel 1200 having a plurality of cooling fins 1210. The gun barrel 1200 may be constructed of the same materials and in the same manner described above. For example, FIG. 12B illustrates a side view of a plurality of crystalline carbon fiber rope segments 400 that are held in a desired orientation by a webbing (not shown). The crystalline carbon fiber rope segments 400 and webbing may then be placed in a mold 1220, as shown in FIG. 12C. The gun barrel 1200 is then molded in the manner described above. In one embodiment, the cooling fins 1210 are formed during the molding process. In an alternative embodiment, the cooling fins 1210 are machined during a post-molding process.

In an alternative embodiment (not shown), BN filled thermoplastic or thermosets can be used for a first portion of a structure, and the crystalline carbon fiber segments are used for another portion of the structure. Such a structure would offer the ability to increase thermal conductivity while maintaining dielectric properties. The materials and combinations discussed herein can be used for multiple applications, including unmanned aerial vehicles, computers, other electronics, engines, weapons, electrodes, tires, wheels and more.

Figure 13:
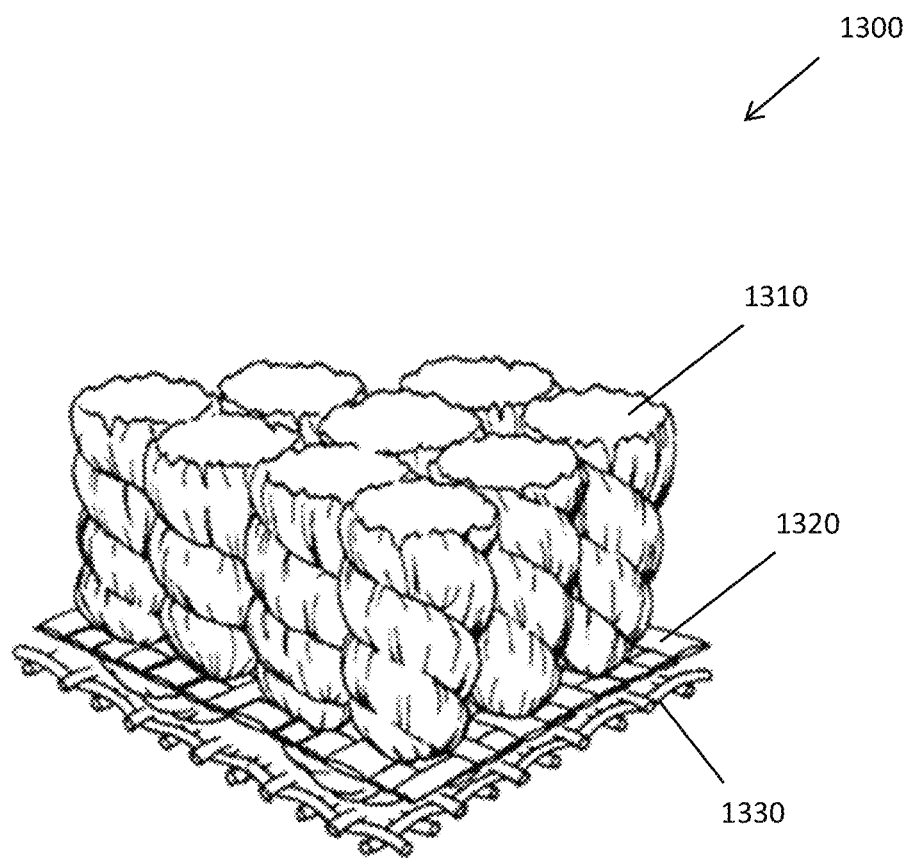
FIG. 13 illustrates a perspective view of one embodiment of a carpet segment formed by a crystalline carbon fiber rope.

In an alternative embodiment, after a crystalline carbon fiber rope is woven, it is formed into a carpet through a tufting process. FIG. 13 illustrates a perspective view of one embodiment of a carpet segment 1300 formed by tufts 1310 of a crystalline carbon fiber rope. The tufts 1310 may be formed from any of the crystalline carbon fiber ropes discussed above. The tufts 1310 are oriented such that their longitudinal axes are parallel to each other. Due to the conductive properties of the crystalline carbon fiber rope, the carpet 1300 is a sheet of material that conducts heat in a direction orthogonal to its surface. Thus, the carpet 1300 may be used to form a large surface area of axially loaded heat sinks.

The carpet 1300 may also conduct electricity in a direction orthogonal to its surface. As one of ordinary skill would understand, the selection of the materials for the crystalline carbon fiber rope will determine the material properties of the carpet 1300.

In the illustrated embodiment, the carpet segment 1300 includes a support ply 1320 and a backing 1330. The tufts 1310 are woven into the support ply 1320, and the backing 1330 is affixed to the support ply 1320 with an adhesive, such as latex. In an alternative embodiment (not shown), the backing is omitted.

The support ply 1320 and the backing 1330 may be formed with any type of weave. For example, without limitation, one or both of the support ply 1320 and the backing 1330 may have a plain weave, twill, or triaxle weave. The support ply 1320 and backing 1330 may be formed by a thermoplastic or thermoset resin. Exemplary materials for the support ply 1320 and backing 1330 include, without limitation, glass, carbon, aramid, fiber reinforced composites, and other structural fibers.

Figure 14A:
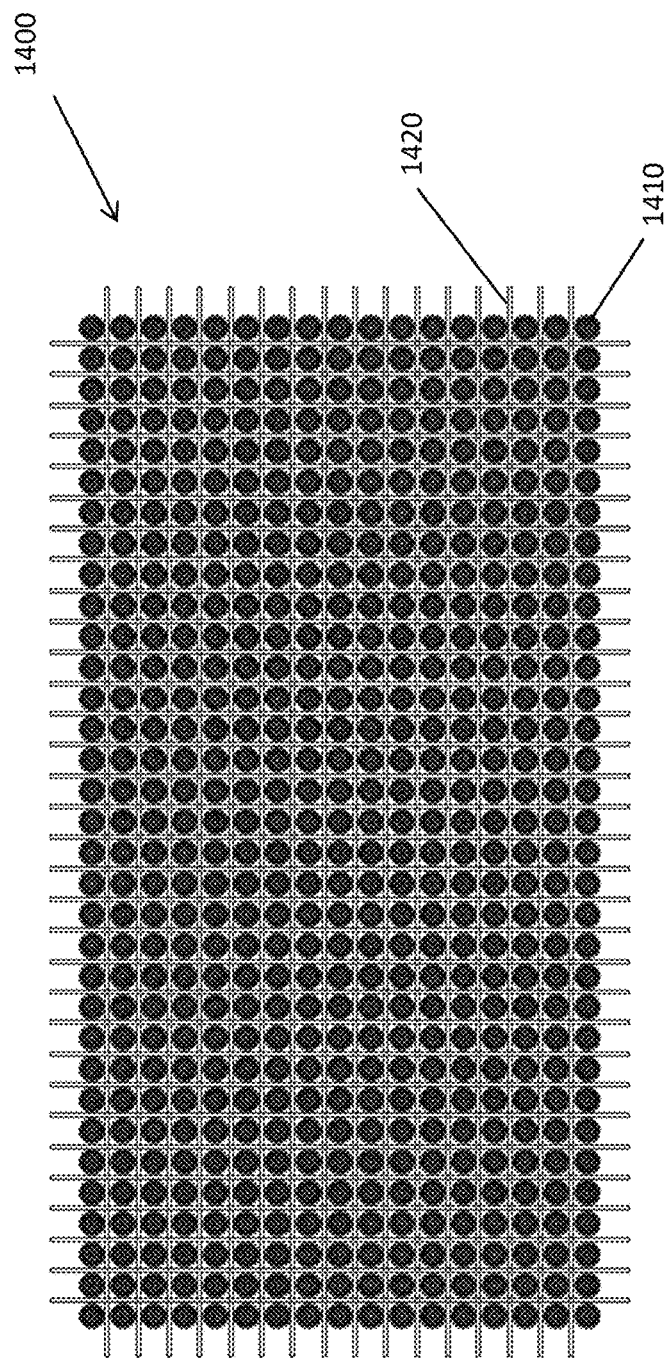
FIGS. 14A and 14B illustrate a top and side view, respectively, of an alternative embodiment of a carpet segment formed by a crystalline carbon fiber rope.
Figure 14B:
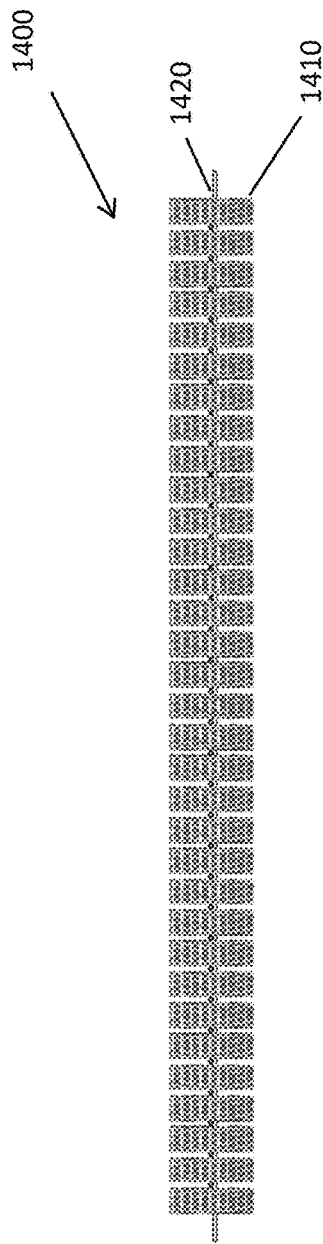

FIGS. 14A and 14B illustrate a top and side view, respectively, of an alternative embodiment of a carpet segment 1400 formed by tufts 1410 of a crystalline carbon fiber rope. Except for the differences described herein, the carpet segment 1400 is substantially the same as the carpet segment 1300 described above, including the alternative embodiments discussed.

In this embodiment, the tufts 1410 are woven into a support ply 1420 that supports the tufts 1410 at a middle region of each individual tuft. In alternative embodiments (not shown), the support ply may support each tuft at a top or bottom region of the individual tuft. While the individual tufts are shown as having substantially the same length, in alternative embodiments, different tufts may have different lengths.

Figure 15:
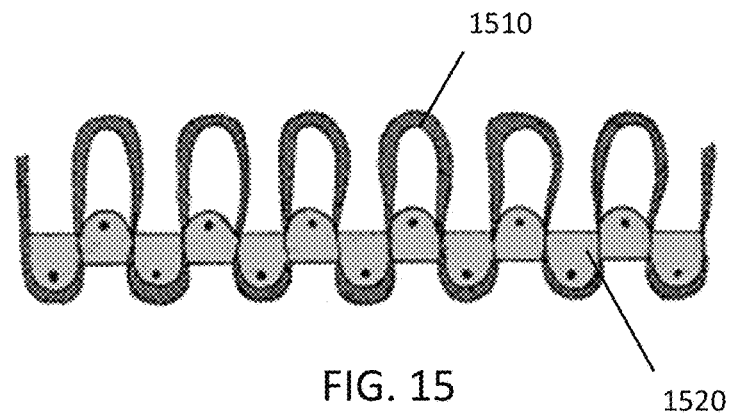
FIG. 15 illustrates a side view of a crystalline carbon fiber rope woven through a support ply during a tufting process.

The carpet may be formed by any known tufting process. FIG. 15 illustrates a side view of a crystalline carbon fiber rope 1510 woven through a support ply 1520 during a tufting process. The crystalline carbon fiber rope 1510 and support ply 1520 may be any of the ropes and plies discussed above.

In this exemplary process, the rope 1510 is woven through the support ply 1520 such that a tight weave is formed at a bottom side of the support ply 1520 and a loose weave is formed at a top side of the support ply 1520. In other words, loops of the rope 1510 extend from the top of the support ply 1520.

After the rope 1510 is woven through the support ply 1520, each of the loops extending from the top of the support ply is severed to form tufts (such as the tufts 1310 shown in FIG. 13). The severing may be performed with mechanical means, such as with shears or a straight edge. Alternatively, the severing may be performed with a laser or a heat source.

In an alternative embodiment (not shown), a loose weave may be formed on both sides of the support ply, such that loops of rope extend from both sides. In such an embodiment, the loops on both sides of the ply are severed to form tufts (such as those shown in FIGS. 14A and 14B). The severing may be performed with mechanical means, such as with shears or a straight edge. Alternatively, the severing may be performed with a laser or a heat source.

The tufting process may be automated using a tufting machine, such as those manufactured by CARD-MONROE CORP. or TUFTCO. As one of ordinary skill in the art would understand, modifications may be required to an existing machine to sever loops of rope on both sides of a support ply.

Figure 16:
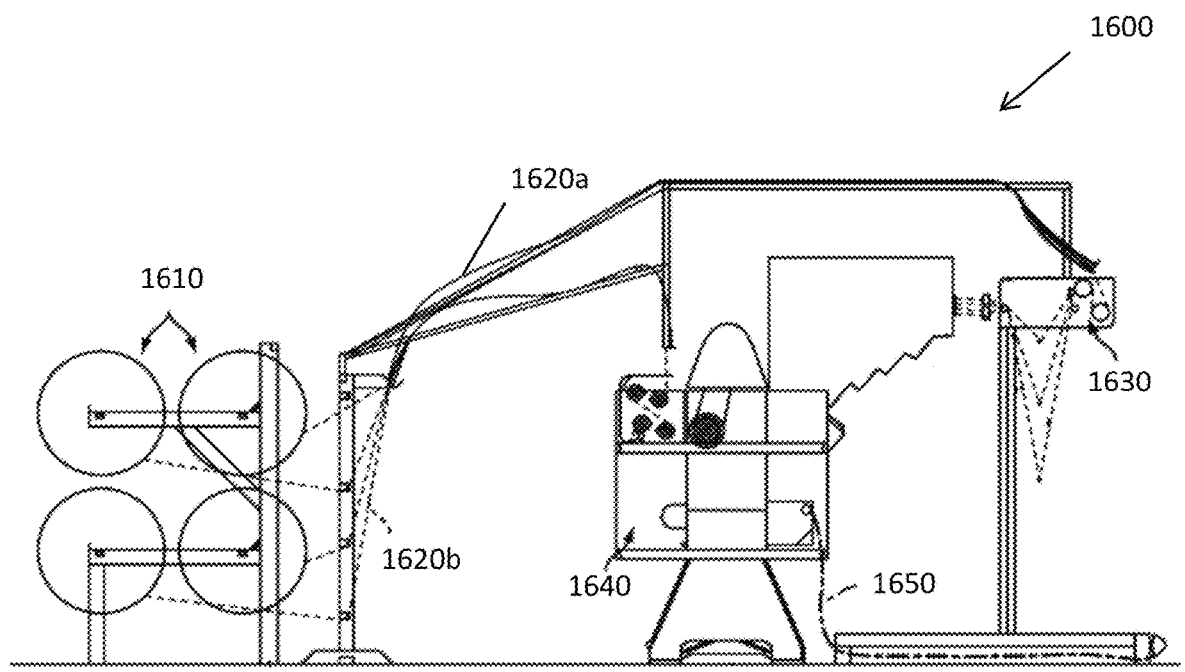
FIG. 16 is a schematic drawing illustrating a side view of a tufting system.

FIG. 16 is a schematic drawing illustrating a side view of an exemplary tufting system 1600. The tufting system 1600 includes a plurality of spools 1610 that carry the yarns 1620*a* for the support ply and the crystalline carbon fiber rope 1620*b*. The support ply yarns 1620*a* are fed along a first path to a loom 1630, where they are woven into the support ply. The crystalline carbon fiber rope 1620*b* is fed along a second path to a tufting machine 1640 that weaves the rope 1620*b* into the support ply and performs a severing operation as described above. The tufting machine 1640 may also apply a backing to the support ply with an adhesive to form a finished carpet 1650. In an alternative embodiment (not shown), the backing may be applied by a separate machine at a different stage. In another alternative embodiment (not shown), no backing is applied.

The finished carpet may then be rolled for storage or transportation. The finished carpet may also be cut to any desired shape or size. The cut carpet may be employed in any product to aid in conducting heat in a desired direction. For example, without limitation, the curt carpet may be molded into tires, aircraft surfaces (including manned and unmanned aircraft), electronic enclosures, motor housings, and PCB board backings.

Figure 17:
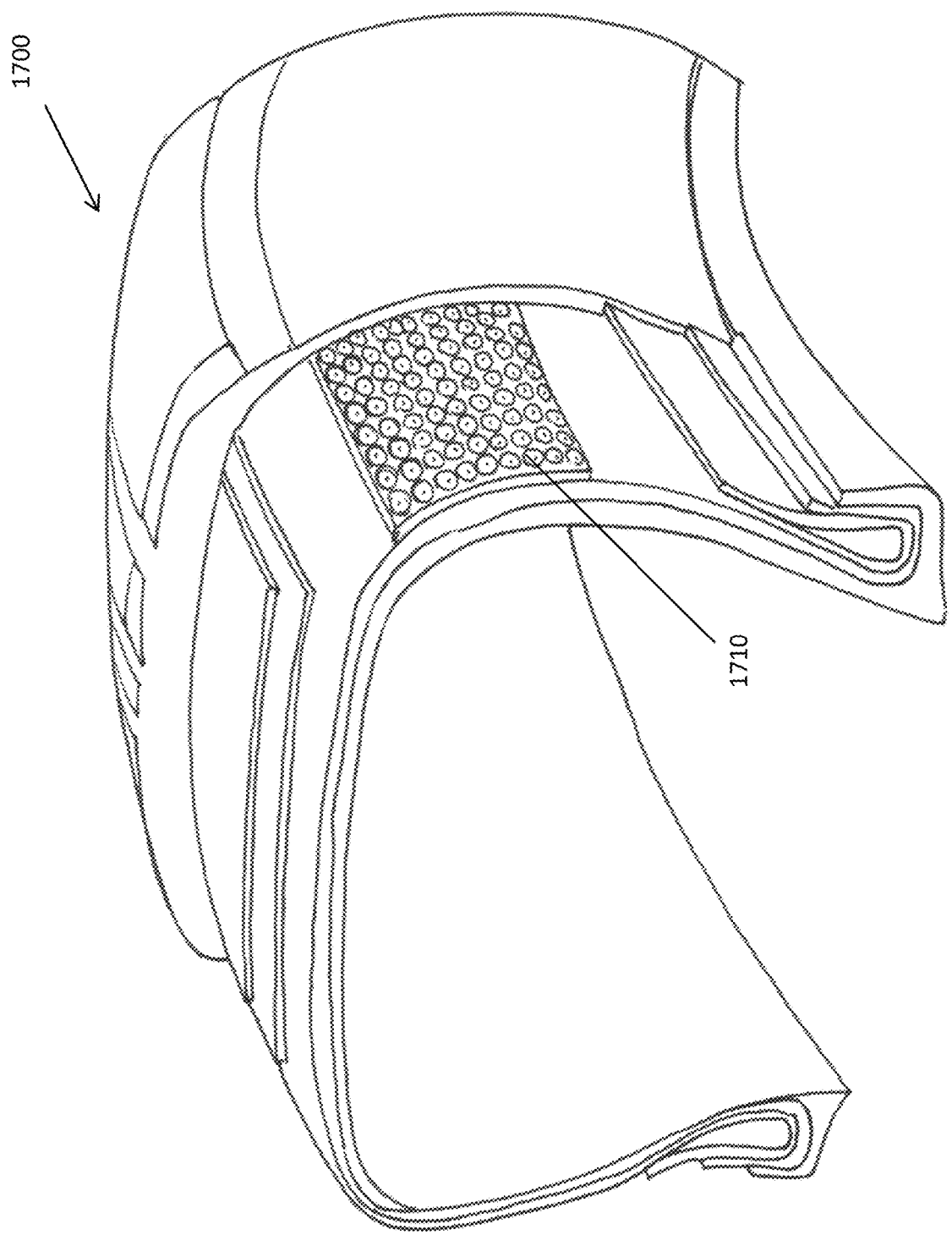
FIG. 17 is a peel-away perspective view of a green tire having a carpet of crystalline carbon fiber rope embedded in a sidewall.

As one example, FIG. 17 is a peel-away perspective view of a green tire 1700 having a carpet 1710 of crystalline carbon fiber rope embedded in a sidewall region. The carpet 1710 may be located in any region of the tire where it is desirable to remove heat. The material properties of the carpet 1710 may also serve to reinforce portions of the tire.

When the green tire 1700 is cured, the carpet 1710 may no longer retain the shape of the distinct tufts. However, the carpet will still retain its heat conducting properties and will aid in removing heat from the tire during use.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

What is claimed is:

1. A method of making a thermally conductive component, the method comprising:
   providing a plurality of tows of crystalline carbon fiber;
   providing a plurality of tows of additional fiber;
   forming a rope of the plurality of tows of crystalline carbon fiber and the plurality of tows of additional fiber;
   sheathing the rope;
   cutting the rope into a plurality of rope segments;
   placing the plurality of rope segments in a mold;
   applying heat and pressure in the mold to form the plurality of rope segments into a desired shape; and
   removing the formed shape from the mold.

2. The method of claim 1, further comprising providing at least one of a thermoset and thermoplastic.

3. The method of claim 1, wherein the placing the plurality of rope segments in a mold includes placing each rope segment in a same orientation.

4. The method of claim 1, wherein the forming a rope includes one of braiding and twisting the plurality of tows of crystalline carbon fiber and the plurality of tows of additional fiber.

* * * * *